(12) United States Patent
Haase et al.

(10) Patent No.: US 8,123,944 B2
(45) Date of Patent: Feb. 28, 2012

(54) PROCESSES OF AQUEOUS SOLIDS TREATMENT

(75) Inventors: Richard A. Haase, Missouri City, TX (US); Eileen Taylor, Pt. Neches, TX (US)

(73) Assignee: ClearValue Technologies, Inc., Missouri City, TX (US)

( * ) Notice: Subject to any disclaimer, the term of this patent is extended or adjusted under 35 U.S.C. 154(b) by 0 days.

(21) Appl. No.: 11/068,101

(22) Filed: Feb. 28, 2005

(65) Prior Publication Data

US 2005/0145566 A1 Jul. 7, 2005

Related U.S. Application Data

(63) Continuation of application No. PCT/US02/27772, filed on Aug. 27, 2002.

(60) Provisional application No. 60/315,464, filed on Aug. 28, 2001, provisional application No. 60/346,225, filed on Oct. 19, 2001.

(51) Int. Cl.
C02F 3/00 (2006.01)

(52) U.S. Cl. ........ 210/605; 210/609; 210/610; 210/612; 210/620; 210/621; 210/622; 210/623

(58) Field of Classification Search .................. 210/605, 210/609–610, 612, 620–626
See application file for complete search history.

(56) References Cited

U.S. PATENT DOCUMENTS

| 3,226,317 | A | * | 12/1965 | Albertson | ............... 210/609 |
| 3,642,619 | A | | 2/1972 | Lo Sasso | |
| 3,763,039 | A | | 10/1973 | Wilson | |
| 3,920,599 | A | | 11/1975 | Jurlock | |
| 3,994,806 | A | | 11/1976 | Rausch | |
| 4,040,953 | A | | 8/1977 | Ort | |
| 4,137,165 | A | | 1/1979 | Cosica | |
| 4,242,448 | A | * | 12/1980 | Brown, III | ............... 435/42 |
| 4,246,099 | A | | 1/1981 | Gould | |
| 4,250,269 | A | | 2/1981 | Buckman | |
| 4,329,428 | A | | 5/1982 | Ghosh | |

(Continued)

FOREIGN PATENT DOCUMENTS

EP 451922 A1 * 10/1991

(Continued)

OTHER PUBLICATIONS

Murthy et al., "Mesophilic Aeration of Autothermal Thermophilic Aerobically Digested Biosolids to Improve Plant Operations," Water Environment Research, vol. 72, No. 4 (Jul./Aug. 2000), p. 476-483.*

(Continued)

Primary Examiner — Chester Barry

(57) ABSTRACT

In the field of water treatment, this invention relates to economical methods, processes and apparatus for preparing Class A bio-solids wherein: dewatering costs and energy costs are efficient, the solids product has reduced ammonia and sulfide odor, and the concentration of solids in the aqueous solids may vary from approximately 3 to approximately 90 percent.

This invention presents mesMophilic and thermophilic digestion in concert, wherein mesophilic digestion incorporates strains of Thiobacillus with nitrifiers to remove sulfide(s) and ammonia from bio-solids. Chemical dewatering of thermophilic digested bio-solids is accomplished incorporating a cationic, quatemized or an anionic polyacrylamide with at least one selected from a list consisting of: an aluminum salt, an iron salt, an amine comprising a quatemized nitrogen moiety and any combination therein. A quatemized polyacrylamide is presented alone. The use of magnesium oxide and/or magnesium hydroxide as a disinfectant/preservative for said bio-solids Is also presented.

61 Claims, 5 Drawing Sheets

U.S. PATENT DOCUMENTS

| | | | |
|---|---|---|---|
| 4,450,092 A | | 5/1984 | Huang |
| 4,456,534 A | | 6/1984 | Lambert |
| 4,479,879 A | | 10/1984 | Hashimoto |
| 4,481,115 A | | 11/1984 | Wade |
| 4,555,329 A | | 11/1985 | Sykes |
| 4,588,508 A | | 5/1986 | Allenson |
| 4,609,470 A | | 9/1986 | Chung |
| 4,670,158 A | | 6/1987 | Kelly |
| 4,673,511 A | | 6/1987 | Richardson |
| 4,760,027 A | * | 7/1988 | Sublette .................. 435/266 |
| 4,845,034 A | | 7/1989 | Menger |
| 4,968,435 A | | 11/1990 | Neff |
| 4,983,298 A | * | 1/1991 | Fuchs et al. .................. 210/613 |
| 5,035,808 A | | 7/1991 | Hassick |
| 5,047,511 A | | 9/1991 | Mehrotra |
| 5,112,500 A | | 5/1992 | Jones |
| 5,183,576 A | | 2/1993 | Wood |
| 5,213,693 A | | 5/1993 | McGrow |
| 5,269,929 A | * | 12/1993 | Sublette et al. .............. 210/610 |
| 5,401,417 A | | 3/1995 | Dentel et al. |
| 5,405,554 A | | 4/1995 | Neff |
| 5,451,326 A | | 9/1995 | Carlson |
| 5,492,624 A | | 2/1996 | Rozich |
| 5,525,228 A | | 6/1996 | Dague |
| 5,580,550 A | | 12/1996 | Gough |
| 5,601,725 A | | 2/1997 | Chung |
| 5,614,616 A | | 3/1997 | Buysch |
| 5,651,890 A | | 7/1997 | Trost |
| 5,681,475 A | | 10/1997 | Lamensdorf |
| 5,681,480 A | | 10/1997 | Langley |
| 5,698,109 A | | 12/1997 | Payne |
| 5,705,072 A | * | 1/1998 | Haase .......................... 210/605 |
| 5,846,433 A | | 12/1998 | Sorensen |
| 5,846,435 A | * | 12/1998 | Haase .......................... 210/727 |
| 5,906,750 A | | 5/1999 | Haase |
| 5,938,937 A | | 8/1999 | Sparapany |
| 5,948,261 A | | 9/1999 | Pressley |
| 5,954,964 A | | 9/1999 | Nielsen |
| 6,025,426 A | | 2/2000 | Hurlock |
| 6,032,613 A | * | 3/2000 | Rahman et al. ................ 119/231 |
| 6,036,862 A | * | 3/2000 | Stover .......................... 210/603 |
| 6,048,438 A | | 4/2000 | Rosencrance |
| 6,066,349 A | | 5/2000 | Haase |
| 6,083,404 A | | 7/2000 | Sommese |
| 6,136,193 A | * | 10/2000 | Haase .......................... 210/605 |
| 6,221,652 B1 | * | 4/2001 | Janssen et al. ................ 435/266 |
| 6,632,362 B2 | * | 10/2003 | Miller, III ..................... 210/603 |
| 6,685,834 B1 | * | 2/2004 | Murthy et al. ................ 210/613 |
| 6,719,903 B1 | | 4/2004 | Pressley |
| 6,783,679 B1 | | 8/2004 | Rozich |
| 2001/0039041 A1 | * | 11/2001 | Faircloth et al. .............. 435/117 |
| 2002/0046474 A1 | * | 4/2002 | Novak et al. ................... 34/259 |

FOREIGN PATENT DOCUMENTS

| | | |
|---|---|---|
| GB | 1188394 | 4/1970 |
| WO | WO 93/02968 | 2/1993 |

OTHER PUBLICATIONS

"A Plain English Guide to the EPA Part 503 Biosolids Rule," Chapter 5, at Table 5-3, http://www.epa.gov/owm/mtb/biosolids/503pe/503pe_5.pdf.*

Chitikela, Srinivasarao, and Dentel, Stephen K. Evaulation of Dual Chemical Conditioning and Dewatering of Anaerobically Digested Biosolids, 10'th Annual Residuals & Biosolids Management Conference: 10 Years of Progress and a Look Toward the Future, Rocky Mountain Water Environment Association, Aug. 18-21, 1996.

Dentel, Stephen K., and Chitikela Srinivasarao, Evaulation of Dual Chemical Conditioning and Dewatering of Anaerobically Digested Biosolids, The Final Project Report: Sludge Dewaterability Assessment for East Bay Municipal Utility District (EBMUD) California, Department of Civil and Environmental Engineering, University of Delaware, Newark, Jun. 1995.

USEPA—Environmental Regulations and Technology, Autothermal Thermophilic Aerobic Digestion of Municipal Wastewater Sludge, Office of Research and Development, Washington, EPA/625/10-90/007.

Prakasam, T.B.S., et al., Effect of Recycling Thermophilic Sludge on the Activated Sludge Process, US EPA Research and Development, Cincinnati, EPA/600/S2-90/037, Sep. 1990.

Kemmer, Frank N., The Nalco Water Handbook, Second Edition, Nalco Company, McGraw Hill Book Company, pp. 8.3-8.4.

Ohara, George T., et al., Sludge Dewatering Studies at Hyperion Treatment Plant, Journal WPCF, May 1978, pp. 912-925.

Shimp, Gary F., et al., The Future of Solids Management, Water Environment and Technology, Nov. 2000, pp. 35-39.

U.S. Appl. No. 08/555,244, Nov. 1995, Pruszynski.

Wikipedia, Oxidation State, http://en.wikipedia.org/wiki/Oxidation_state.

Webster's Ninth New Collegiate Dictionary, Merriam Webster, pp. 988, 1990.

* cited by examiner

Figure 1
Legend for Figures 2 - 5

| Symbol | Equipment | Equipment Description |
|---|---|---|
|  | Digester | May be Thermophilic or Mesophilic, as well as Aerobic or Anaerobic - Type is Annotated in Drawing – Type is as is known in the art. |
|  | Heat Exchanger | As is known in the art. |
|  | Dewatering | First Stage of dewatering - Can Be a Belt Press or a Centrifuge or Other, as is Known in the Art |
|  | Hot Air Evaporative Dryer | As is known in the art. |
|  | Steam Boiler | Manufactures Steam, as is known in the art. |
| 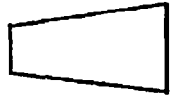 | Air Blower | As is known in the Art |
|  | Bio-Solids Process Line | Piping as is Known in the Art |
|  | Service Process Line | Piping as is Known in the Art Service can be air, water or chemical additives |
| 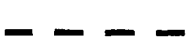 | Various | Optional |

Anaerobic Bio-Solids Recycling without Recycle

Anaerobic Bio-Solids Recycling with Recycle

Aerobic Bio-Solids Recycling without Recycle

Aerobic Bio-Solids Recycling with Recycle

PROCESSES OF AQUEOUS SOLIDS TREATMENT

RELATED APPLICATION DATA

This application claims priority of U.S. Provisional Patent Application Ser. No. 60/315,464 filed Aug. 28, 2001; 60/346,225 filed Oct. 19, 2001 and of PCT Application PCT/US02/27772 filed Aug. 27, 2002. This application is a continuation of PCT/US02/27772.

FIELD OF THE INVENTION

In the field of water treatment, this invention relates to improved methods, processes and apparatus for sludge, separated solids and bio-solids treatment, as well as the bio-solids from these improved methods, processes and apparatus. This invention relates to economical methods, processes and apparatus for preparing Class A aqueous solids wherein dewatering costs and energy costs are efficiently managed; and wherein, the solids product has reduced ammonia and sulfide odor; and wherein, the percent solids in the aqueous product may vary from approximately 3 percent to approximately 90 percent.

BACKGROUND OF THE INVENTION AND DESCRIPTION OF THE PRIOR ART

Since the inception of the Clean Water Act of 1974, municipal and industrial wastewater treatment facilities have had to dispose of solids separated from water during treatment. The aqueous solution of these solids is often termed sludge; however, for clarity, the term aqueous solids is used herein where said aqueous solids are aqueous primary solids and/or aqueous secondary solids. Aqueous primary solids are defined as aqueous solids that are separated from the treated water in primary treatment; primary treatment physically separates solids from the treated water, usually in a clarifier or a dissolved air flotation device and often with a chemical coagulant. Aqueous primary solids can contain organic and/or inorganic solids. Aqueous secondary solids, bio-solids, are defined as aqueous solids that are separated from the treated water in secondary treatment; secondary treatment is the biological treatment in a water treatment plant, usually a wastewater treatment plant. Aqueous secondary solids nearly always contain organic solids and may contain inorganic solids. Aqueous solids, be it aqueous primary solids and/or aqueous bio-solids, are normally sent to digestion. In digestion, the solids volume within the aqueous phase is reduced by bacteria that consume, digest, the separated aqueous solids. The performance of digestion is determined by the reduction of Volatiles in the aqueous solids. Volatiles are defined in the laboratory, as the solids remaining on a filter from a filtered sample after the filtered sample is heated to approximately 102° C., yet do not remain after a second heating to approximately 600° C. This mass measurement difference is a definition of the heavier organic content of the filter sample and is therefore an estimation of the biological content and/or organic biological food content of the solids in an aqueous sample. In a mesophilic digestion system, the percent Volatiles reduction is normally 40 to 50 percent. In thermophilic digestion, the percent Volatiles reduction is normally greater than mesophilic and can be as high as 55 to 65 percent. Mesophiles are defined as bacteria that operate between the temperatures of approximately 40 and 105° F. Thermophiles are defined as bacteria that operate between the temperatures of approximately 115 and 165° F. To manage transportation and disposal costs, nearly all wastewater treatment facilities prefer to reduce the Volatiles content of the digested solids as much as is economically practical.

After digestion, the final digested solids product (Digested Solids) must be properly disposed. Disposal of the Digested Solids (DS) is normally accomplished by either land application or by disposal in a landfill. To minimize the handling and transportation expense of the DS, the water content of the DS is normally reduced from approximately 94-97 percent, in digestion, to approximately 75 percent by chemical treatment utilizing a cationic polyacrylamide and mechanical separation utilizing a belt press, centrifuge, drying bed or other type device. To reduce the water content further, many facilities incorporate heated air-drying, evaporative air-drying, or a combination thereof. A drier product is required if the DS is stored for an extended time. DS placed in storage having a moisture content of greater than approximately 15 percent, yet less than approximately 90 percent, have the capability of spontaneous combustion. Many facilities use this biochemistry to heat treat the DS via composting, thereby to reduce the pathogen content of the DS.

Municipal wastewaters, and usually industrial wastewaters, generally contain four types of human pathogenic organisms: bacteria, viruses, protozoa and helminthes (parasitic worms). The actual species and density of pathogens contained in the raw wastewater will depend on the health of the particular community and/or the inclusion of significant rainwater runoff from animal sources. The level of pathogens contained in the untreated DS will depend on the flow scheme of the collection system and the type of wastewater treatment. For example, since pathogens are primarily associated with insoluble solids (non-volatile solids), untreated primary solids have a higher density of pathogens than the incoming wastewater.

Since pathogens only present a danger to humans and animals through physical contact, one important aspect in land application of DS is to minimize, if not eliminate, the potential for pathogen transport. Minimization of pathogen transport is accomplished through reduction of vector attraction. Vectors are any living organism capable of transmitting a pathogen from one organism to another either directly or indirectly by playing a key role in the life cycle of the pathogen. Vectors that are specifically related to DS could most likely include birds, rodents and insects. The majority of vector attraction substances contained in the DS are in the form of Volatiles. If left unstabilized, Volatiles will degrade, produce odor and attract pathogen-carrying Vectors.

On Feb. 19, 1993, the National Sewage Sludge Use and Disposal Regulations (EPA's Chapter 40 Code of Federal Regulations Part 503 and commonly referred to as the EPA's 40 CFR 503 Regulation) were published in the Federal Register. The US EPA's 40 CFR 503 regulation define DS treatment methods that transform DS into Class A DS; Class A DS is DS regarded substantially free of pathogens and Vector attraction. In essence, the Regulation establishes several categories in terms of stabilization, pathogenic content, beneficial reuse and disposal practices for all land-applied DS. These regulations set forth: chemical methods, temperature methods, methods that include a combination of chemical and temperature, as well as other methods including composting to treat DS for land application. Since 1993, experience has taught that the most reliable methods of Vector reduction are the temperature and/or chemical methods. The temperature methods include direct heating and thermophilic digestion.

However, the direct heating methods are rather expensive, as are the chemical methods. The chemical methods require raising the pH of the DS to a minimum of 12 utilizing an oxidizer; typically, lime is used. This is expensive, requiring nearly a 10 percent by mass dosage of lime; further, very alkaline DS is not a good fertilizer for land application. The temperature methods require heating the DS to a minimum of 50° C. for a specified period of time that is dependent on the amount of temperature above 50° C. This is expensive due to the energy requirement and the cost of heating a significant mass of aqueous solids.

The most economical method of disinfection involves Thermophilic Digestion (TD). TD is inexpensive from the standpoint of the cost of disinfection. Energy cost is minimal due to the thermophilic process itself. In the case of Aerobic TD (ATD), digestion naturally occurs so exothermically that once initiated, operating temperature is self-sustaining. In the case of Anaerobic TD (AnTD), the hydrocarbon gas produced in digestion can be sent to fire a boiler producing steam to maintain required temperature. Moreover, as mentioned previously, a side benefit to Vector reduction is an increase in the reduction of Volatiles by TD, thereby reducing the volume of aqueous solids. However, ATD and AnTD (TD in general) have significant issues in relation to odor and to dewatering cost. The dewatering cost of TD aqueous solids (TDS) is much more than that of Mesophilic Digested aqueous solids (MDS) due to the nature of thermophilic bacteria as compared to mesophilic bacteria. While messophilic bacteria naturally secrete tackifying polysaccharides to initiate floc formation, thereby naturally creating a microfloc, thermophiles do not. This biological difference can make the dewatering cost of TDS expensive and render the process of TD uneconomical. Previous work can be referenced in U.S. Pat. Nos. 5,846,435 and 5,906,750. However, these patents do not incorporate a means of controlling the odor of the TDS. TDS have strong ammonia and sulfide odors that are objectionable and that attract Vectors. Further work is documented in U.S. Pat. No. 6,083,404, wherein a three component system of dewatering TDS is presented; however, this patent has no method for controlling sulfide or ammonia.

Bacteria, Volatiles, contain a significant amount of protein and lipoic acids. A very large portion of the bacteria cell contains the proteins, DNA and RNA sequences, for cell reproduction. Significant portions of these proteins are amino acids. Lipoic acids contain sulfur. Amino acids, DNA and RNA contain nitrogen. As a result, the volatiles digestion releases ammonia and sulfide(s). While sulfidic odors are present in both MDS and in TDS, strong and objectionable ammonia odors have been specifically associated with TDS. The digestion process itself is an oxidation process of the volatiles. As such, the release of ammonia and sulfide(s) biologically occurs. However, it does appear that the mesophilic digestion (MD) process uses a much larger portion of the ammonia as a nutrient and/or in a conversion to nitrogen gas than does the TD process. Monitoring of ammonia nitrogen levels in TDS has found the ammonia to measure as high as 1500 to over 2000 ppm. At such levels, most of the ammonium hydroxide converts to ammonia gas. Ammonia gas is known to be toxic at these concentrations to all mesophilic organisms. Ammonia gas in the final DS can make land application of the DS objectionable; ammonia gas in the TD process can make the process itself objectionable. Further, since both the MD and the TD process create sulfide(s), the biological conversion of ammonia to nitrates, much less to nitrogen, is impractical. Sulfide(s), hydrogen sulfide and sulfur dioxide, are toxic to nitrifying bacteria. Having sulfide toxicity, MD cannot perform nitrification to remove ammonia odor from the DS, whether the DS be TDS or MDS. Further Nitrifiers, usually nitrosomonas and nitrobacter, are mesophilic bacteria, which cannot live above 105° F.; therefore, nitrification is impractical in TD.

Previous work in thermophilic digestion has been done by Ort, U.S. Pat. No. 4,040,953, which actually suggests that thermophilic digestion has certain advantages including a lower solids retention time and more readily dewatering characteristics. There is no discussion by Ort that TD would have odor issues, whether ammonia or sulfide(s). There is no discussion by Ort that TD would have dewatering issues. U.S. Pat. No. 5,492,624 presents the ATD, wherein there is no mention of dewatering or odor issues in relation to TD or in relation to the presented ATD. U.S. Pat. No. 6,203,701 presents an ATD process and apparatus; again, odor and dewatering issues are not discussed. Literature published in November of 2001 indicates a lack of understanding for both the source of thermophilic digestion odors and for a solution. "The Future of Solids Treatment?" Water, Environment and Technology, Vol. 12, No. 11, pp. 35-39. This literature documents that there are odor issues with thermophilic bio-solids; within this document there is no understanding of the source of the odor or any anticipated solution.

This instant invention identifies sulfide(s) as both an odor component and as a component to inhibit nitrification, thereby limiting nitrification. Previous work in U.S. Pat. No. 6,136,193 identifies thiobacillus and thiobacillus denitrificans as biological cultures that will remove sulfide(s) from sulfide laden aqueous systems. While this patent does recommend the use of thiobacillus with other biological cultures, this patent has no discussion of methods of TD and has no method of dewatering TDS.

Concentrations of sulfide(s) as low as 5 ppm are known to inhibit nitrification and to begin killing nitrosomonas. Concentrations of sulfide(s) as low as 3 ppm are inhibitory to nitrosomonas. As referenced in U.S. Pat. No. 5,705,072, the inhibitory and lethal aspects of sulfide(s) to nitrosomonas can be controlled by either oxidation of the sulfide(s) to sulfate or with the addition of a strain of bacteria to consume, thereby control, the sulfides. This can be performed with at least one of thiobacillus and/or thiobacillus denitrificans. However, this patent does not present TD, TDS or provide for dewatering. Further, there is no oxygen or available electron donor in the AnTD; therefore, a method is needed to control sulfide(s) and ammonia in the TDS from AnTD. Nitrosomonas and nitrobacter cannot live in an anaerobic or a thermophilic environment. Every pound of ammonia converted to nitrates by nitrification, requires approximately four pounds of oxygen, while thiobacillus and thiobacillus denitrificans are mesophiles; therefore, both the ATD and the AnTD operate at temperatures above the operating range of thiobacillus, thiobacillus denitrificans, nitrosomonas and nitrobacter.

Ammonia Nitrification

For treating the ammonia content of wastewaters, certain aerobic mesophilic autotrophic microorganisms can oxidize ammonia to nitrite, which can be further microbially oxidized to nitrate. Said reaction sequence is known as Nitrification. Nitrification reduces the total ammonia-nitrogen content of the wastewater. Ammonia is removed from the wastewater by bacterial oxidation of ammonia to nitrate ($NO_3$), using bacteria that metabolize nitrogen. Nitrification is carried out by a limited number of bacterial species and under restricted conditions including a narrow range of pH and temperature and dissolved oxygen levels, along with reduced Chemical Oxygen Demand (COD) and reduced Biological Oxygen Demand (BOD) levels. Atmospheric oxygen is used as the oxidizing agent. Nitrifying bacteria grow slowly and nitrogen oxidation is energy poor in relation to mesophilic or thermophilic carbon oxidation. In addition, nitrification is inhibited by the presence of a large number of compounds, including organic ammonium compounds, sulfide(s) and the nitrite ion ($NO_2$). Furthermore, nitrifying bacteria subsist only under aerobic conditions and require inorganic carbon ($CO_3^-$ or $HCO_3^-$) for growth. The most common sequence is: 1

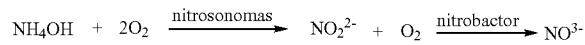

Approximately 4 pounds of oxygen and approximately 6 pounds of carbonate and/or bicarbonate are required for every pound of ammonia converted to nitrate.

It may be worthwhile to note that the term "ammonia" is used in the art to describe "ammonia as a contaminant in wastewater". "Ammonia" refers, in this art, to the $NH_4^+$ ion that exists in aqueous solution and that is acted on microbially, with the following equilibrium existing in the aqueous solution:

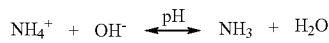

As the total ammonia concentration approaches approximately 150 ppm and the pH approaches approximately 8.0, this reaction is driven to the right. At ammonia concentrations of approximately above 350 ppm and the pH approximately above 8.0, ammonia gas ($NH_3$) toxicity exists in the water. In addition to being toxic, ammonia gas is volatile, having a significant vapor pressure.

The Rancidity Process

The most practical recycle application of aqueous solids, whether MDS or TDS, is land application as a fertilizer. Further, most governmental agencies are requiring a Class A product for land application of DS. Upon application as a fertilizer, the aqueous solids, MDS or TDS, will decompose into fertilizer naturally. Bio-Solids are a natural organic fertilizer.

However, prior to land application, the aqueous solids can decompose by the rancidity process. The rancidity process is the natural degradation process for protein products. The rancidity process proceeds by the creation of sulfuric acid from sulfur in the lipoic acids. As the pH drops by the creation of sulfuric acid, the acidic pH further breaks apart amino acids and lipoic acids; this further creates sulfuric acid from the lipoic acids while releasing ammonia from the amino acids. While it appears sensible to oxidize sulfide odors of the aqueous solids or to control the rancidity process with an oxidizer, typical oxidation methods are not practical. Typical oxidizers such as caustic, potash, soda ash and lime, etc. are not self-buffering. These chemicals will increase the pH over 10 having the capability to increase the pH over 12. As the pH increases above 10, oxidation of the lipoic acids and of the amino acids releases sulfide(s) and ammonia. Due to this process, the addition of typical oxidizers will only accelerate the degradation of lipoic acids and amino acids. Further, most pH stabilizers are not self-buffering. Sodium hydroxide has a very strong ability to neutralize acids, but is not self-buffering. In the case of recycled proteins, stabilization of acid degradation reactions within 12 hours requires an amount of sodium hydroxide that will oxidize the proteins, thereby increasing degradation reactions. Unfortunately, pH stabilizers that have been determined to be self-buffering do not have a very strong ability to neutralize acids. Although sodium carbonate and sodium bicarbonate are self-buffering, they are limited in ability to neutralize acids.

U.S. Pat. No. 6,066,349 presents a method of controlling the rancidity process within proteins; however, this patent does not include a process for the control of odors from aqueous solids or TDS, or for the dewatering of TDS.

Vectors and the Environment

To control Vectors (a.k.a. pathogen transport) in our environment, the US EPA and many state agencies are requiring production of Class A bio-solids for land application of bio-solids. In combination with this legislative and regulatory trend, solid waste is becoming an issue to municipalities as landfill sites become more difficult to locate and permit. Since bio-solids are a natural and organic fertilizer, a process to economically produce Class A aqueous solids without an appreciable objectionable odor is needed. Further, a process that helps to insure that DS do not become attractive to Vectors would be beneficial to the environment, as well as to human and animal health.

SUMMARY OF THE INVENTION

A primary object of the invention is to devise effective, efficient and economically feasible methods, processes and apparatus for producing Class A aqueous solids per the US EPA's 40 CFR 503 Regulation, wherein said aqueous solids do not produce objectionable odor.

Another object of this instant invention is to devise effective, efficient and economically feasible methods, processes and apparatus for removing sulfide odors in aqueous solids.

Another object of this instant invention is to devise effective, efficient and economically feasible methods, processes and apparatus for removing ammonia odors from aqueous solids.

Another object of this instant invention is to devise effective, efficient and economically feasible digestion, including thermophilic digestion: methods, process and apparatus wherein sulfide and ammonia odors can be controlled or reduced.

Another object of this instant invention is to provide methods, processes and apparatus to prepare digested solids for land application as a fertilizer, such that the digested solids have minimal objectionable odor and wherein the odor of sulfide(s) and/or of ammonia is reduced or controlled.

Another object of this instant invention is to provide methods, processes and apparatus to prepare digested solids wherein objectionable odor is controlled from the rancidity process.

Another object of this instant invention is to provide methods, processes and apparatus to prepare digested solids for recycling wherein the digested solids contain a disinfectant to reduce the risk of recontamination of the bio-solids.

Another object of this instant invention is to devise effective, efficient and economically feasible methods, processes and apparatus to produce recyclable Class A aqueous solids per the US EPA's 40 CFR 503 Regulation such that the bio-solids have minimal objectionable ammonia and/or sulfide odor and have a disinfectant to reduce the risk of contamination of the bio-solids with pathogens.

It is another object of this instant invention to provide a method of aqueous solids treatment comprising thermophilic digestion and mesophilic aerobic digestion, wherein said aqueous solids are transferred between said thermophilic digestion and said mesophilic aerobic digestion, and wherein the concentration of ammonia and/or sulfide(s) within said aqueous solids is reduced during said mesophilic aerobic digestion.

It is still another object of this instant invention to provide a process for digesting aqueous solids defining a process flow path in which said aqueous solids travel through a number of units including at least a thermophilic digestion unit and a mesophilic aerobic digestion unit, wherein said mesophilic aerobic digestion unit comprises nitrifiers, and wherein the concentration of ammonia is reduced in said aqueous solids.

It is still yet another object of this instant invention to provide an apparatus for aqueous solids treatment comprising one or more treatment units defining a process flow path in which aqueous solids travel including at least one thermophilic digestion unit and at least one mesophilic aerobic digestion unit, wherein ammonia and/or sulfide(s) is removed in said mesophilic aerobic digestion unit(s).

It is still yet also another object of this instant invention to provide a composition comprising: water, thermophiles, and nitrifiers, wherein the concentration of ammonia is less than approximately 350 mg/L and the concentration of sulfide(s) is less than 5 mg/L.

BRIEF DESCRIPTION OF THE DRAWINGS

A better understanding of the instant invention can be obtained when the following detailed description of the preferred embodiments are considered in conjunction with the following drawings, in which:

FIG. 1 is a legend of symbols used throughout FIGS. 2 through 5.

FIG. 1 illustrates the preferred embodiments of this invention in block diagram form for Anaerobic Thermophillic Digestion (AnTD) without mesophilic aerobic digestion (MAD) recycle.

FIG. 2 illustrates the passing of aqueous bio-solids through the Acid Generation Process [1], Methane Generation Process [2], Heat Exchanger [3], and Mesophilic Aerobic Digestion [4], as well as optional Thermophillic Anerobic or Facultative Mesophillic Digestion (De-nitrification) [5], and optional, First Stage Dewatering: belt press, centrifuge, or other [6], and as well as optional Evaporative Drying [7]. FIG. 2 further depicts a boiler [8].

FIG. 3 illustrates the passing of aqueous bio-solids through the Acid Generation Process [1], Methane Generation Process [2], Heat Exchanger [3], and Mesophilic Aerobic Digestion [4], as well as optional Thermophilic Anerobic or Facultative Mesophilic Digestion (De-nitrification) [5], and optional First Stage Dewatering: belt press, centrifuge or other [6], and as well as optional Evaporative Drying [7]. FIG. 2 further depicts a Boiler [8].

FIG. 4 illustrates the passing of aqueous bio-solid through Thermophilic Digestion [1], Heat Exchanger [3], and Mesophilic Aerobic Digestion [4], as well as optional Thermophilic Anerobic or Facultative Mesophilic Digestion (De-nitrification) [5], and optional First Stage Dewatering: belt press, centrifuge, or other [6], and as well, as optional Evaporative Drying [7]. FIG. 2 further depicts Air Blower [9] and Air Blower [9.1], along with optional Air Scrubber [10].

FIG. 5 illustrates the passing of aqueous bio-solids through Thermophilic Digestion [1], Heat Exchanger [3], and Mesophilic Aerobic Digestion [4], as well as optional Thermophilic Anerobic or Facultative Mesophilic Digestion (De-nitrification) [5], and optional First Stage Dewatering: belt press, centrifuge, or other [6], and as well as optional evaporative Drying [7]. FIG. 2 further depicts Air Blower [9] and Aix Blower [9.1], along with optional Air Scrubber [10].

DETAILED DESCRIPTION OF THE PREFERRED EMBODIMENTS

Figure 2:
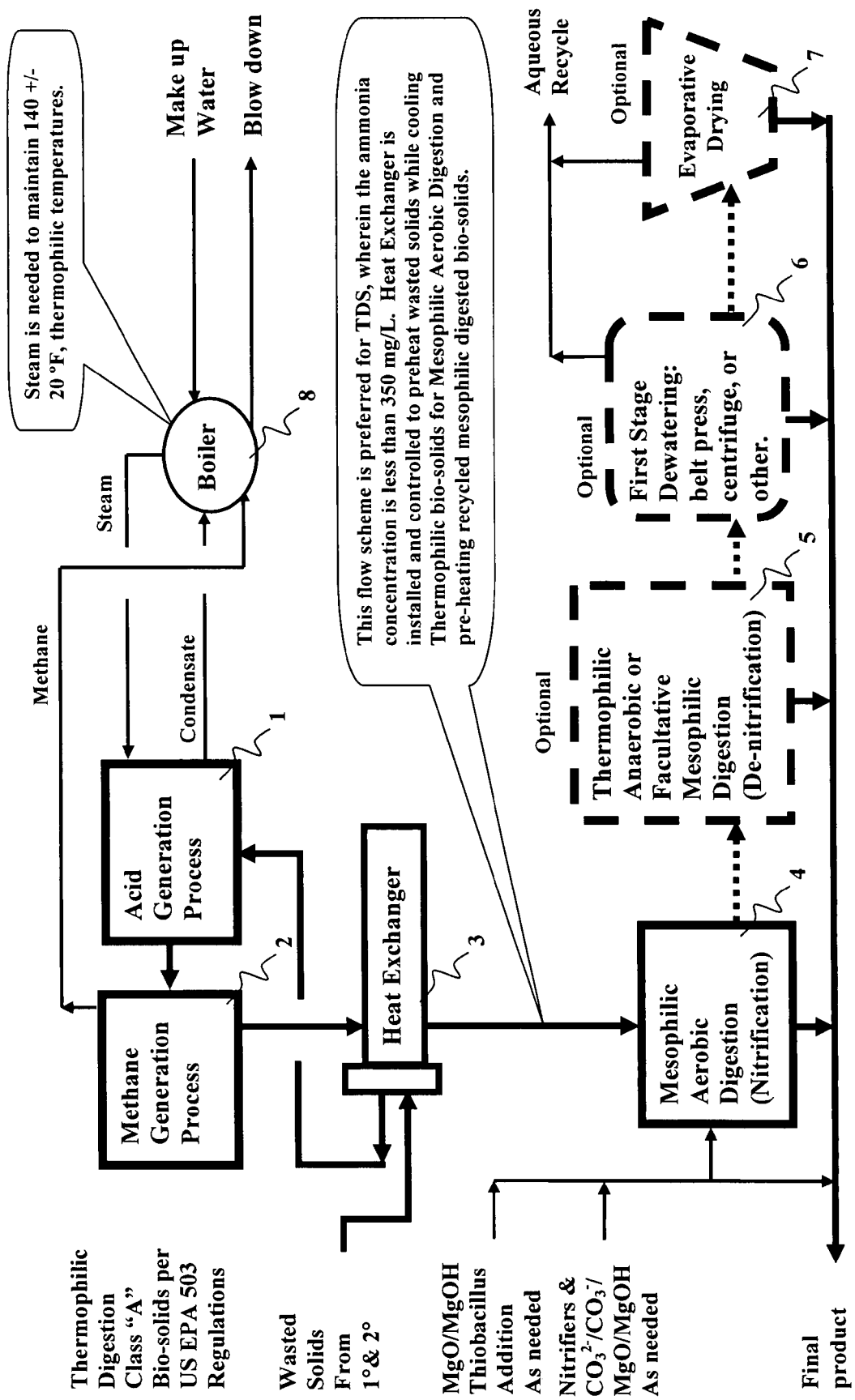
FIG. 2 illustrates the preferred embodiments of this invention in block diagram form for Anaerobic Thermophillir Digestion (AnTD) without messophilic aerobic digestion (MAD) recycle.
Figure 3:
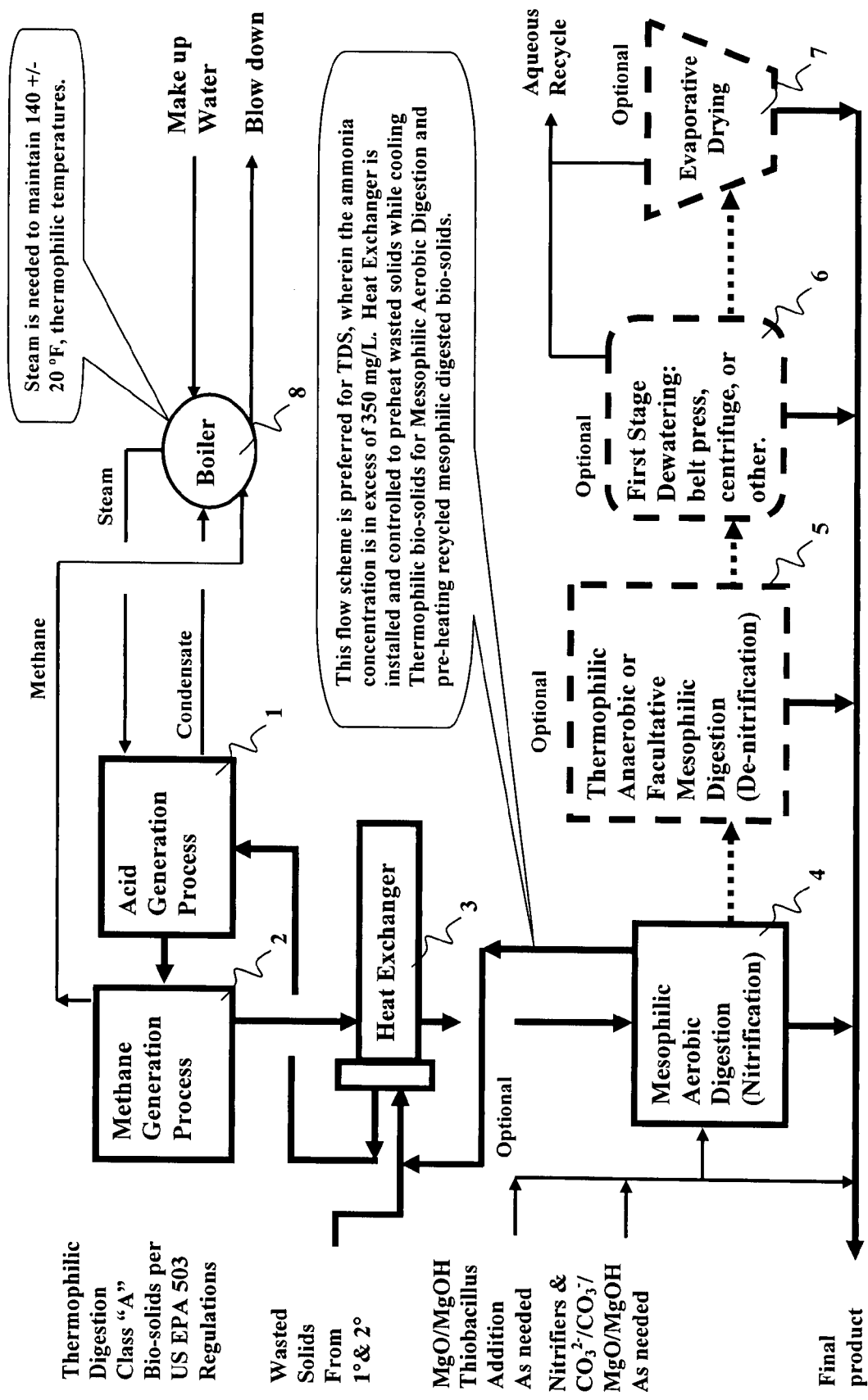
FIG. 3 illustrates the preferred embodiments of this invention in block diagram form for AnTD with (MAD) recycle.
Figure 4:
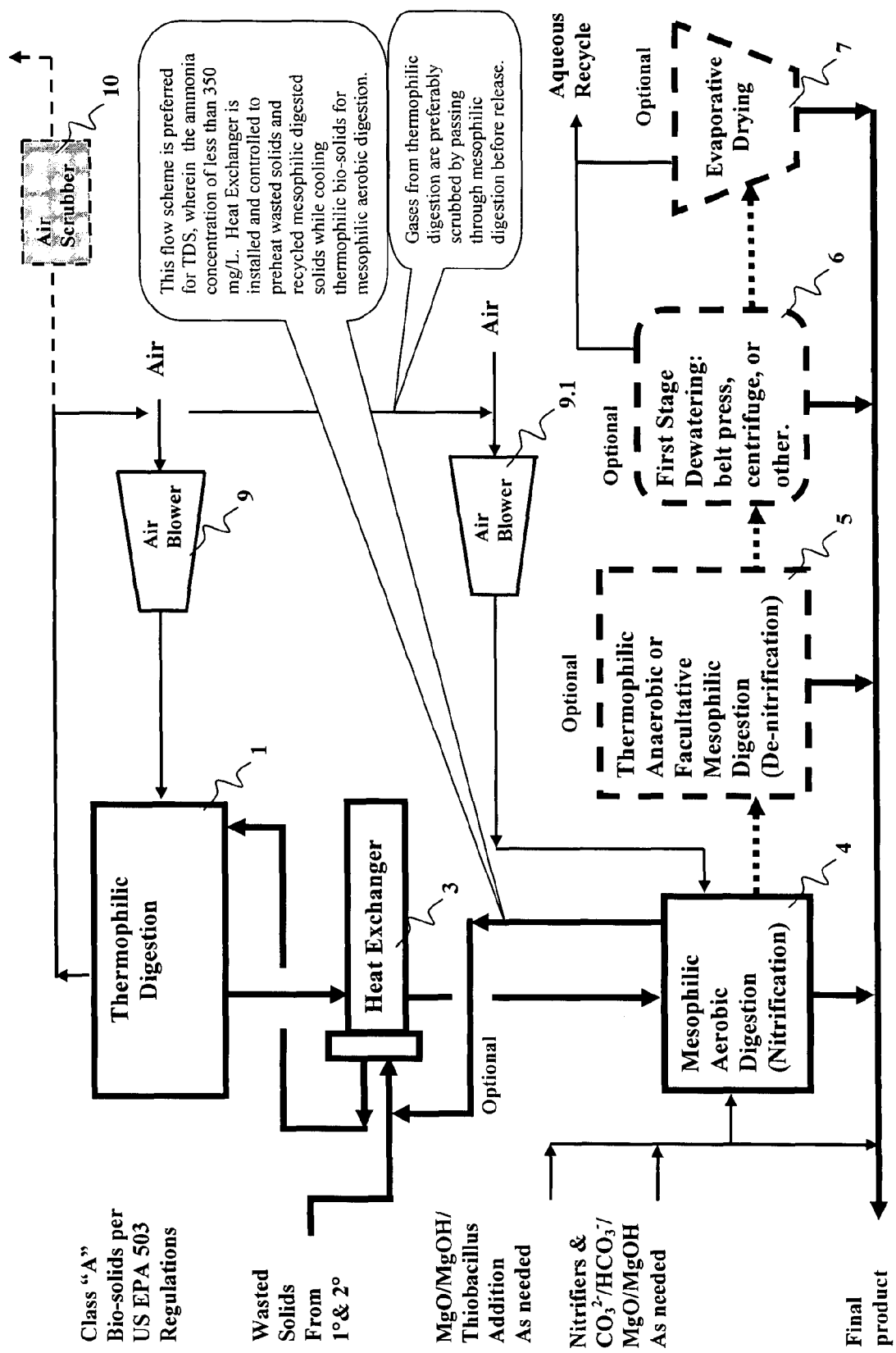
FIG. 4 illustrates the preferred embodiments of this invention in block diagram form for Aerobic Thermophillic Digestion (ATD) without (MAD) recycle.
Figure 5:
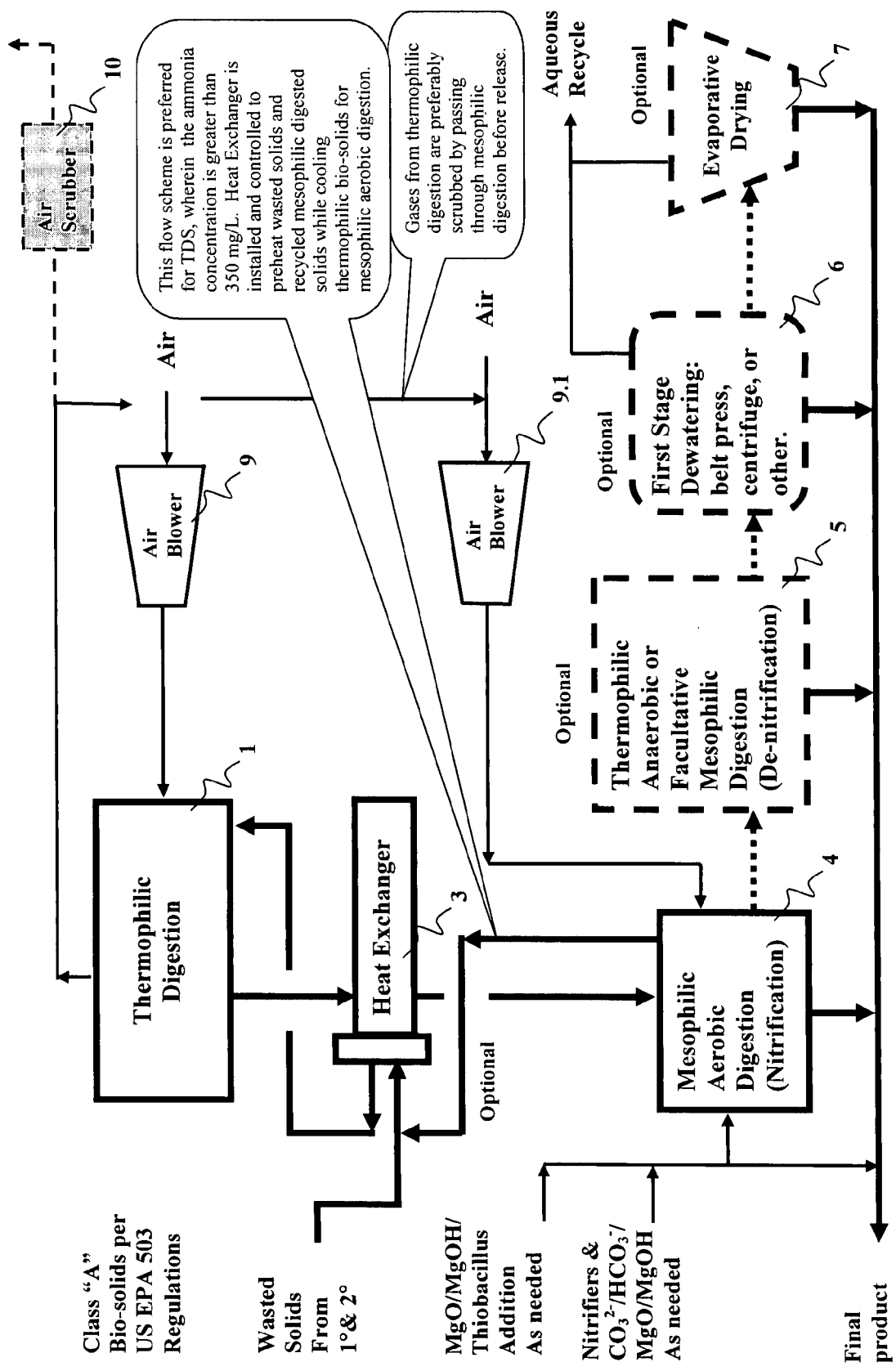
FIG. 5 illustrates the preferred embodiments of this invention in block diagram form for ATD with (MAD) recycle.

The instant invention is described in connection with one or more preferred embodiments. However, it should be understood that the instant invention is not limited to those embodiments. In contrast, the instant invention includes all alternatives, modifications and equivalents as may be included within the spirit and scope of the specification and of the appended claims.

The instant invention provides improved methods, processes and apparatus of producing Class A digested biosolids, as defined by the US EPA '40 CFR 503 regulation, along with methods, processes and apparatus to produce MDS and TDS, which have minimal objectionable odor. The instant invention provides AnTD methods, processes and apparatus along with ATD methods processes and apparatus, by utilizing MAD methods, processes and apparatus to control objectionable ammonia and sulfide odors, as well as economical methods, processes and apparatus to dewater TDS.

The Use and Mechanism of Thiobacillus and/or Thiobacillus Denitrificans

The instant invention utilizes an obligate aerobe, often known as facultative bacteria, which is capable of metabolizing sulfur into its biomass. While there are a limited number of strains having this capability within the obligate aerobe variety, the instant invention prefers use of the strain of bacteria known as thiobacillus or those known as the thiobacillus variety (herein after all obligate aerobes capable of metabolizing sulfur into biomass are simply referred to as thiobacillus). The instant invention most prefers the use of thiobacillus denitrificans (thiobacillus and thiobacillus denitrificans are hereafter also referred to as "S Cultures"). S Cultures are utilized for removing, while using, sulfur compounds as sources of energy. It is preferred that said S Cultures are fermented (raised) on a sulfide type compound. It is preferred that an inoculation and/or augmentation program utilize said S Cultures to permit nitrification and/or control sulfide odor. In a most preferred embodiment, S Cultures comprise 100% of the inoculation. In a preferred embodiment S Cultures are blended with heterotrophs. The S Cultures are preferably added in a blend combination of about 1% to about 100% S Cultures, wherein the remaining cultures in the blend are at least one of: nitrifying micro-organisms and heterotrophs. The S Cultures are preferably introduced into any mesophilic aerobic biological system. It is most preferred to add said S Cultures via an enricher reactor, prior to introduction. As a preferred version, the enricher reactor reduces required inoculation and/or augmentation. It is most preferred to add S Cultures with nitrifying micro-organisms, as S Cultures and most nitrifying microorganisms are obligate aerobes, thereby populate or grow at about the same rate.

S Cultures are preferably delivered or packaged as a refrigerated concentrated liquid S Cultures are most preferably delivered dried or freeze dried. S Cultures can be dry blended with heterotrophic cultures and/or nitrifying microorganisms. S Cultures have the ability to grow under reduced oxygen conditions and at lower than neutral pH ranges. However, S Cultures do not generate pH levels that are as low as the pH levels generated by sulfate-reducing bacteria (SRB). Despite being an obligate anaerobic, S Cultures are able to flourish at interfaces of anaerobic environments where S Cultures obtain energy by absorbing and detoxifying sulfides, hydrogen sulfide ($H_2S$) and sulfur dioxide ($SO_2$). Sulfide(s) are combined with low levels of available oxygen to generate neutral products (sulfur and water), along with metabolic energy for the S Cultures. A major advantage of the S Cultures used in the instant invention is that the resulting sulfur is not further oxidized to sulfuric acid.

Application of Magnesium Oxide and/or Magnesium Hydroxide

The instant invention prefers the use of magnesium oxide (MgO) and/or magnesium hydroxide (Mg $(OH)_2$) as a preservative and/or disinfectant for TDS or DS. Magnesium oxide hydrolyzes to magnesium hydroxide upon contact with water. The preservative, MgO and/or Mg$(OH)_2$, significantly improves the shelf life of TDS or of aqueous solids while controlling sulfide odor. The preservative of the instant invention effectively and efficiently buffers TDS and/or MDS, as well as aqueous solids in general, from acid degradation, rancidity, reactions.

The uniqueness of magnesium oxide and/or magnesium hydroxide as high and low pH buffer lends to a unique solution to reduce or control rancidity reactions. Upon coming into contact with water, magnesium oxide immediately hydrolyzes to form magnesium hydroxide. However, in contrast to sodium and potassium, magnesium oxide forms two (versus one) hydroxyl groups (Mg $(OH)_2$ vs. NaOH, CaOH and KOH) in an aqueous environment. Therefore, on a molar basis, magnesium oxide is two times more efficient to neutralize acids than is sodium hydroxide or potassium hydroxide. Sodium hydroxide, potassium hydroxide and calcium hydroxide have the ability to neutralize acids and increase pH; however, sodium hydroxide, potassium hydroxide and calcium hydroxide (which includes calcium oxide as the oxide hydrolyzes upon contact with water) are so strong as to oxidize proteins, as well as fats, during a short-term increase of the pH before a rapid decrease in pH, which occurs due to subsequent acidification of the proteins. High concentrations of sodium hydroxide will have a pH at or near 12-14. Hydroxide ion concentrations available above 10 will oxidize most organic materials, especially proteins and fats. As a point of reference, many biocides are strong oxidizers. Magnesium oxide is much more effective neutralizing acidity than sodium bicarbonate as well.

Finally, magnesium oxide and magnesium hydroxide limit biological activity, thereby performing as disinfectants. Such a disinfection capability is important to TDS and to MDS. Once a Class A aqueous solid is created, Vectors could contaminate the product. Application of magnesium oxide and/or magnesium hydroxide, or both can provide a preventative disinfectant to the ADS.

Thermophillic Digestion

The most preferred methods, processes and apparatus to obtain Class A aqueous solids are with Thermophilic Digestion (TD). In TD, aqueous solids are digested, preferably from secondary, biological, treatment and/or aqueous solids from primary treatment. While TD can be either anaerobic or aerobic, it is most preferred that the TD temperature and residence time be such to obtain Class A treatment per the US EPA'40 CFR 503 regulation. While pathogen destruction performance can be obtained without thermophilic treatment, treatment of aqueous solids without TD is not preferred. Compared to AnTD, the ATD process requires the least amount of equipment. In either case ATD or AnTD, it is preferred that plug flow performance be obtained. It is most preferred that in both the AnTD and in the ATD process that the plug flow and/or batch reaction aspects of the US EPA'40 CFR 503 regulation be obtained. To obtain plug flow performance, additional vessel(s) are normally required than that required for continuous performance. If AnTD is used, it is preferred that the acidification portion of digestion be prior to a separate vessel which is to be used for the gas production process. While the acidification process can be mesophilic, it is preferred that both vessels in AnTAD be thermophilic. It is most preferred that the gas phase vessel be thermophilic.

In AnTD, by separation of acidification and gasification, better control can be made of the pH within each process, thereby providing the ability to optimize each process, as well as an improved ability to obtain plug flow performance. It is most preferred that acidification is prior to gasification. It is preferred that the energy available in the hydrocarbon gas produced from the gas phase process of AnTD be used to heat AnTD. It is most preferred that the hydrocarbon gas, from the gas phase of AnTAD, be fired to heat a boiler to maintain thermophilic temperatures per the US EPA's 40 CFR 503 regulation in AnTD. If post digestion TDS drying includes hot air or evaporative air-drying, it is most preferred to use at least a portion of the energy available from the hydrocarbon gas of AnTD gasification in evaporative air-drying of the TDS.

It is most preferred to operate TD (ATD or AnTD) between 130° F. and 150° F.; it is preferred to operate TD between 120° F. and 165° F. It is most preferred that the residence time and temperature combination in TD obtain the required fecal and coliform counts required by the US EPA's 40 CFR 503 regulation.

Messophilic Digestion

To control sulfides and/or ammonia, TD is to be preferably accompanied with Mesophilic Aerobic Digestion (MAD). It is important to note that MAD can be any mesophilic biological system which is capable of supporting nitrification. While MAD does not necessarily have to perform digestion, it is preferred that MAD perform a final digestion. The primary purpose of MAD is to biologically scrub ammonia and/or sulfide(s) generated in AnTD and/or ATD. MAD is preferably to utilize a biological nitrifying population. MAD is preferably to utilize an S Culture population.

It is most preferred that said nitrifying population contains nitrosomonas; it is preferred that said nitrifying population contains nitrosomonas and nitrobacter. It is an embodiment that nitrification occurs with heterotrophs; however, this is not preferred. It is most preferred that MAD be sized such that the nitrifying population is self-sustaining from the ammonia generated in thermophilic digestion. In order to support nitrification, it is most preferred that MAD has a mean biological residence time greater than 10 days; it is preferred that MAD have a mean biological residence time greater than 5 days.

It is most preferred that the rate of addition to MAD from TD or recirculation from MAD back to TD be controlled by the ammonia concentration in TD and/or in MAD. It is most preferred that the ammonia concentration be controlled in MAD such that ammonia toxicity is not a biological operating challenge in MAD or in TD. To control nitrates and/or nitrites, it is most preferred that MAD transfer aqueous solids back into an AnTD and/or an additional facultative mesophilic digester so as to perform denitrification. In the AnTD or in a facultative mesophilic digester, a denitrifying population can be maintained converting nitrites and/or nitrates to nitrogen gas. It is an embodiment to perform said denitrification with S Cultures. It is preferred, if denitrification is required, that denitrification be performed in either a mesophilic facultative digester or in AnTD with a facultative population capable of using nitrites and/or nitrates as an electron donor source.

It is preferred that MAD comprise at least one selected from a list consisting of: magnesium oxide, magnesium hydroxide, S Cultures, nitrifiers, carbonate, bicarbonate and any combination thereof. It is preferred that a unit be available to add to the aqueous solids in MAD or to the aqueous solids upstream of MAD at least one selected from a list consisting of: magnesium oxide, magnesium hydroxide, S Cultures, nitrifiers, carbonate, bicarbonate and any combination thereof. It is most preferred that said nitrifiers comprise nitrosomonas or nitrosomonas and nitrobacter. It is most preferred that carbonate and/or bicarbonate be added to the aqueous solids in MAD and/or upstream of MAD to support nitrification in MAD, as required. It is an embodiment to perform the above preferred embodiments for MAD or for any aqueous solids, wherein said aqueous solids are not processed via TD, as well as those processed via TD. As such, these embodiments are capable of controlling ammonia and/or sulfide odor(s) from any type of organic containing aqueous solids. Therefore, these embodiments present the capability of controlling in any aqueous solids: sulfide(s) to a concentration of approximately less than 5 mg/L and ammonia to a concentration of approximately less than 350 mg/L.

To facilitate nitrification, the sulfide concentration must be controlled in MAD. Control of sulfide(s) for nitrification and for sulfide odors in the TDS, MDS or in the aqueous solids is preferred. It is most preferred to control sulfide(s) with a population of S Cultures in MAD. It is preferred to oxidize sulfide(s) to sulfate by treating the TDS or MDS with at least one selected from the list of: magnesium oxide, magnesium hydroxide, air, oxygen and any combination thereof. It is an embodiment to oxidize sulfide(s) to sulfate with extended aeration in the MAD; however, this is not preferred as increased equipment investment would be required. It is most preferred that sulfide(s) be controlled to less than 3 ppm and preferred that sulfide(s) be controlled to less than 5 ppm in MAD. It is preferred to use at least one selected from the list of S Cultures, magnesium oxide, magnesium hydroxide and a combination thereof is used to control sulfide(s) in the MAD. It is preferred that sulfide(s) be controlled to less than approximately 5 ppm in the treated aqueous solids.

It is most preferred that oxygen is available in MAD for nitrification; nitrification requires an approximate 4:1 ratio of $O_2$:$NH_4OH$. To monitor, it is most preferred that the dissolved oxygen in MAD be greater than 1.5 ppm; it is preferred that the dissolved oxygen in MAD be greater than 0.5 ppm. While the nitrification population in MAD may obtain enough carbonate for nitrification from the TDS, if a carbonate source is required, it is most preferred that $CO_3^{2-}$ and/or $HCO_3^-$ be used to provide alkalinity for nitrification. It is preferred that $CO_3^{2-}$ and/or $HCO_3^-$ be used with MgO and/or $Mg(OH)_2$ to control pH and provide a carbonate source for the nitrifiers. To monitor, it is most preferred that the M-Alkalinity from MAD be greater than 100 mg/L; it is preferred that the M-Alkalinity from MAD be greater than 50 mg/L. It is preferred that the M-Alkalinity concentration in the water exit MAD, a gas scrubber or a mesophilic treatment unit be approximately 100 mg/L or greater. It is an embodiment that the M-Alkalinity concentration in the water exit MAD, a gas scrubber or a mesophilic treatment unit be approximately 50 mg/L or greater. Addition of carbonate and/or bicarbonate to the MAD, gas scrubber or mesophilic treatment unit is the preferred means to control M-Alkalinity in the water exit. Alternatively, the carbonate and/or bicarbonate can be added upstream of the corresponding MAD, gas scrubber or mesophilic treatment unit.

It is most preferred that the pH in MAD, a gas scrubber or a mesophilic treatment unit be less than 8.0 and greater than 7.0. It is preferred that the pH in MAD, a gas scrubber or a mesophilic treatment unit be less than 10.0 and greater than 6.5. It is most preferred that the total ammonia nitrogen concentration in MAD be less than 150 ppm. It is preferred that the total ammonia nitrogen concentration in MAD be less than 350 ppm. It is preferred that the ammonia concentration in the final treated aqueous solids be approximately less than 350 mg/L.

If ATD is used, the vapors from TD are preferably to be contained so that the process does not have an objectionable odor. It is preferred for an AnTD or an ATD to pass TD vapors through a scrubber or other mesophilic unit to remove objectionable sulfide and/or ammonia odors. It is most preferred to pass the vapors from AnTD or ATD through MAD, where the sulfide and ammonia conversion biological/chemical process is in place. However, if a scrubber or another mesophilic treatment unit is used, it is preferred that said scrubber and/or mesophilic treatment unit comprise S Cultures to remove sulfide(s) from said vapors. If a scrubber and/or mesophilic treatment unit is used it is most preferred that the aqueous solids within said gas scrubber and/or mesophilic treatment unit comprise at least one selected from a list consisting of: magnesium oxide, magnesium hydroxide, S Cultures, nitrifiers, carbonate, bicarbonate and any combination thereof. It is preferred that a unit be available add to said gas scrubber and/or to said mesophilic treatment unit at least one selected from a list consisting of: magnesium oxide, magnesium hydroxide, S Cultures, nitrifiers, carbonate, bicarbonate and any combination thereof. The addition of magnesium oxide, magnesium hydroxide and/or S Cultures will depend on the sulfide(s) to be removed in the IDS. It is most preferred that the concentration of S Cultures be near a 1:1 ratio with the sulfide(s) to be removed. It is preferred that the ratio of S Cultures to sulfide(s) be in a range of 1:100 to 100:1. If magnesium chemistry is used, it is preferred that the ratio of magnesium oxide and/or magnesium hydroxide to sulfide(s) be near a ratio of 1:1. It is preferred that the ratio of magnesium oxide and/or magnesium hydroxide to sulfide(s) be in a range of 1:100 to 100:1. However, of high importance to the use of magnesium oxide and magnesium hydroxide (magnesium oxide forms magnesium hydroxide upon contact with water) is solubility. It is most preferred that the amount of magnesium hydroxide in the scrubber be less than the solubility limit of magnesium hydroxide to prevent scrubber fouling. The solubility limit of magnesium hydroxide in water is approximately 2 percent, depending upon temperature, pressure and water contaminants.

Should ammonia odors be objectionable in the exhaust flume of the boiler(s) to heat AnTD, either the MAD needs recycle to AnTD or a scrubber is required. If recycle is in place and ammonia odors are objectionable in the exhaust flume of the boiler(s), then MAD needs adjustment. Should sulfide odors be objectionable in the exhaust flume of the boiler(s), it is most preferred that the exhaust flume of the boilers be sent to MAD via the air blowers for MAD, otherwise it is preferred that the exhaust flume of the boilers be sent to a scrubber or to a mesophilic treatment unit.

Energy Management

To manage operating temperatures and energy, it is preferred that a heat exchanger be placed in the exit line from TD, thereby cooling the aqueous solids, TDS, for MAD while heating the aqueous solids, for TD and/or in the case of recycle exit Line from TD, thereby cooling the aqueous solids, TDS, for MAD while heating the aqueous solids from MAD for TD and/or a combination thereof. The operating temperature of TD is preferred to be approximately 140±20° F. The operating temperature of the MAD is preferred to be approximately 85±15° F. The operating temperature of the aqueous solids will depend upon the surrounding environment and is anticipated to be normally approximately 65±30° F.

It is very common for digesters over time to become contaminated with poor biological substrate solids from primary separation. These materials are most commonly grease and hair. While solids, including grease and hair, should pass through a heat exchanger, aqueous solids contamination may cause heat transfer inefficiencies or flow obstructions in the heat exchanger, otherwise known as heat exchanger fouling. To control heat exchanger fouling, it may be necessary to provide: solvent injection, biological augmentation injection, oxidizer injection or surfactant injection upstream of the heat exchanger. Should an oxidizer be used, it is preferred to utilize an acid downstream of the heat exchanger to adjust the pH to approximately that of the digesters. Should an oxidizer be used, it is most preferred that pH adjustment be performed with carbonic acid. It is most preferred that biological injection is used since the biological augmentation would be beneficial to TD as well as to heat exchanger fouling.

TDS can leave digestion from TD; but it is preferred that TDS leave digestion from MAD to minimize odors in the TDS. It is most preferred that the ammonia nitrogen content of the aqueous solids, TDS, be less than 150 ppm and preferred that the ammonia nitrogen concentration be less than 350 ppm. Should there be any ammonia odor in the TDS or MDS, the MAD process should be adjusted for more complete nitrification. From time to time nitrifiers may need to be added to MAD. Should there be any sulfide odor in the TDS or MDS, sulfide odor can be controlled by application of at least one selected from the list of: increased aeration, S Cultures, magnesium oxide, magnesium hydroxide and any combination thereof to at least one selected from the list of MAD, MDS, TDS and any combination thereof.

TDS Dewatering

Chemical means of dewatering, which is normally performed in combination with mechanical means, may be applied in one of five methods, all of which are a significant operational improvement and yield increased operational savings over chemical dewatering means utilizing traditional polyacrylamides. The primary component in the five solids dewatering means is most preferably at least one selected from a group consisting of: an aluminum salt, an iron salt, an amine comprising a quaternized nitrogen moiety and any combination thereof. The amine comprising a quaternized nitrogen moiety is most preferably of the allyl moiety or variety, which contains many variants and is herein defined as the di-allyl di-methyl ammonium chloride (DADMAC) family of compounds or of the DADMAC variety; the epichlorohydrin moiety, which contains many variants and is herein defined as the di-methyl amine (Epi-DMA) family of compounds or of the Epi-DMA variety; or of the Mannich moiety, which contains many variants and is herein defined as the Mannich family of compounds or of the Mannich variety. The amine is preferably polymerized. By the first and most preferred dewatering method, the primary component is added, along with or prior to a cationic polyacrylamide to the TDS and/or MDS. By the second dewatering method, the primary component is added prior to an anionic polyacrylamide to the TDS and/or MDS. By the third dewatering method, a polyacrylamide comprising said quaternized nitrogen moiety as part of its polymer chain, is produced by co-polymerization of acryl amide with monomers of polyquaternary amine quaternization; said polyacrylamide comprising a quaternized nitrogen moiety is added individually to the TDS and/or MDS. The monomers of quaternization for this method are preferably those of quaternization for the polyquaternary amines in the primary component and may comprise at least one selected from a list consisting of: allylic variety, epichlorohydrin variety, Mannich variety and any combination thereof. By the fourth dewatering method, the polyacrylamide comprising a quaternized nitrogen moiety from the third sludge dewatering method is added in concert with or prior to a cationic polyacrylamide or prior to an anionic polyacrylamide to the TDS and/or MDS. By the fifth dewatering method, the polyacrylamide comprising a quaternized nitrogen moiety from the third sludge dewatering method is added in concert with or after a primary component; this combination can be added to the TDS and/or MDS with or prior to a cationic polyacrylamide or prior to an anionic polyacrylamide.

It is most preferred that the chemical portion of dewatering be accomplished with a cationic polyacrylamide in combination with at least one selected from a list of an iron salt, an aluminum salt, an amine comprising a quaternized nitrogen moiety and any combination thereof. It is preferred that dewatering be accomplished with an anionic polyacrylamide after prior treatment with at least one selected from the list of: an iron salt, an aluminum salt, an amine comprising a quaternized nitrogen moiety and any combination thereof. If an amine comprising a quaternized nitrogen moiety is used, it is most preferred that said amine be polymerized. It is further preferred that said polymerized amine have a high molecular weight, measured as a viscosity of greater than 1000 cps at 20 percent activity. If an amine comprising a quaternized nitrogen moiety is used, it is preferred that the quaternization be DADMAC, Epi-DMA or Mannich. For dewatering, it is preferred to minimize the chemical dosage. While it is preferred to have a cationic or anionic polyacrylamide dosage of less than 100 ppm/percent solids, dosages as high as 500 ppm/percent solids are possible. In the case of iron or aluminum salt addition, while it is preferred to have an iron or aluminum dosage of less than 100 mg/percent solids, dosages as high as 500 ppm/percent solids are possible. In the case of polyquaternary amines, while it is preferred to have the polyquaternary amine dosage less than 100 ppm/percent solids, dosages as high as 500 ppm/percent solids are possible. It is most preferred to optimize a dewatering combination of at least one selected form the list of an iron salt, an aluminum salt, an amine comprising a quaternized nitrogen moiety, a polyacrylamide comprising a quaternized nitrogen moiety and any combination thereof with either a cationic polyacrylamide or an anionic polyacrylamide. Such optimization normally leads to a total chemical dosage of approximately less than 250 ppm/percent solids.

The instant invention, in addition to being capable of dewatering different types of SS, can also dewater mixtures of different types of aqueous solids. For example, results of tests have shown that the instant invention dewatering means can be applied to dewater a mixture of aqueous biological solids with aqueous primary solids.

It is preferred to further dewater aqueous solids via heated air to dewater the aqueous solids from digestion to a solids concentration of approximately 90±5 percent.

Bio-Solids Recycling

The most preferred use of the aqueous solids is as a fertilizer. Used as a fertilizer, the TDS and/or MDS is an organic fertilizer providing nutrients to plant life by natural processes. Used as a fertilizer, the TDS and/or MDS provides the capability of recycling minerals, as well as nitrogen, phosphorus and potassium by natural processes. This would be preferred while reducing pathogens and/or Vectors in the environment. By reducing pathogens and/or Vectors in our environment, a TDS treated product is safer to land apply than is recycled manure or an MDS product which does have pathogen destruction treatment. The TDS and/or MDS in this instant invention will not acidify the soil or render the soil alkaline. In comparison, the use of inorganic fertilizers can easily acidify the soil. Further, treatment of bio-solids with oxidizers, chemical treatment, leaves the bio-solids alkaline unless the bio-solid product is pH adjusted with an acid. While the chemical process itself is expensive, utilization of chemically treated aqueous solids is even more expensive requiring the use of an acid to pH adjust the soil, thereby increasing costs even further.

Decomposition of organic matter, bacteria, into nutrients for plant life is the nutrient process that occurs in nature. Therefore, recycling the final TDS product as a fertilizer is a natural recycling process. By controlling pathogens, Vectors and odor of the final TDS product, a natural fertilizer can be made that is beneficial to the environment, and which can be used in many applications.

It is common in many areas to land apply by spraying the liquid TDS or MDS product. From digestion, the percent solids in the TDS or MDS are normally approximately 4±3 percent. Should dewatering be required, a dewatering device such as a belt press, drying bed or centrifuge is preferred, although there are other methods, devices and apparatus available to mechanically and chemically increase the percent solids to approximately 25±8 percent.

Should the TDS or MDS have a recycling or land application that requires storage or bagging, further dewatering to a solids concentration of approximately 90±5 percent will be required to control spontaneous combustion. For TDS or MDS having a solid content of approximately greater than 30 percent and preferably greater than approximately 85 percent, hot air-drying or evaporative air-drying operation is preferred. If employed, hot-air or evaporative air drying is preferred after the aforementioned chemical/mechanical dewatering.

Once the final TDS or MDS product is prepared for recycle, an odor check should be made. If an ammonia odor (concentration) is above specification, MAD needs operational adjustment. If sulfidic odor is present, then either MAD needs adjustment and/or the final product requires an application of at least one selected from a list of: S Cultures, magnesium oxide, magnesium hydroxide and any combination thereof. It is most preferred that the final aqueous solids product has a residual concentration of at least one of magnesium oxide and/or magnesium hydroxide to control at least one selected from the list consisting of sulfide odors, pathogen contamination and rancidity. It is most preferred if the final product be bagged or stored that a residual concentration of at least one of magnesium oxide and/or magnesium hydroxide be maintained; these compounds are also fire retardants.

It is preferred to utilize the final TDS or MDS as a fertilizer. In many applications, it may be preferred to apply the final TDS or MDS product as a liquid. In those applications, the final product is a Newtonian liquid up to approximately 12 percent solids. At these concentrations, the product is stable from spontaneous combustion. To dry the product, it is preferred to dewater per the chemical/polymer/mechanical means reviewed earlier within this specification. These chemical/polymer/mechanical means will create TDS or MDS having a solids content of approximately 25±8 percent. While a solids content of 25±8 percent is potentially combustible with spontaneous combustion, this product is stable for short periods of transportation and/or storage prior to land application. For extended storage times and/or bagging of the TDS or MDS, it is most preferred to dry TDS or MDS via convection or hot air drying to a solids concentration of greater than approximately 85 percent solids.

Macronutrients

The soil may require a greater amount of macronutrients than are available in a final TDS product. Macronutrients include, yet are not limited to: nitrogen, phosphorous and potassium. The percent ratio of Nitrogen-Phosphorous-Potassium in a 90 percent TDS is approximately 6-6-0. Since the Nitrogen-Phosphorus-Potassium percentage ratio in the 90 percent TDS will be approximately a 6-6-0, it may be desirable in some applications to blend the final product with chemical fertilizers. This blending can significantly increase the content of at least one selected from a list consisting of: nitrogen, phosphate, iron, potassium and any combination thereof. It is preferred to blend the final TDS product with at least one selected from a list of: a nitrogen salt, urea, an organic-nitrogen compound, a phosphate salt, an organic-phosphorous compound, a potassium salt, an ammonia/phosphate compound and any combination thereof. It is most preferred to apply said TDS product blended with macronutrients as a fertilizer.

Micronutrients

In many locations the soil may have been depleted of micronutrients. Micronutrients, more commonly called minerals, have been unknowingly farmed from many soils leaving plants and crops deficient in micronutrients and our food chain deficient in micronutrients. Micronutrients can include, yet are not limited to: iron, calcium, magnesium, copper, manganese, zinc, sulfur, selenium, chromium, molybdenum and iodine. It is preferred to blend the final TDS product with at least one of or a salt made from a list consisting of: iron, calcium, magnesium, copper, manganese, zinc, sulfur, selenium, chromium, molybdenum, iodine and any combination thereof. It is most preferred to apply said TDS product blended with micronutrients as a fertilizer.

Process Flow Paths

It is preferred to digest aqueous solids defining a process flow path in which said aqueous solids travel through a number of units including at least one thermophilic digestion unit prior to at least one mesophilic aerobic digestion unit, wherein said aqueous solids in said mesophilic aerobic digestion unit(s) comprise nitrifiers, and wherein the concentration of ammonia is reduced in said aqueous solids.

It is preferred to define a process flow path wherein said aqueous solids from said mesophilic aerobic digestion unit(s) contain a concentration of sulfide(s) less than approximately 5 mg/L, or wherein said aqueous solids from said mesophilic aerobic digestion unit(s) contain a concentration of ammonia less than approximately 350 mg/L.

It is preferred to digest aqueous solids defining a process flow path in which said aqueous solids travel through a number of units including at least one thermophilic digestion unit prior to at least one mesophilic aerobic digestion unit, comprising the oxidation of sulfide(s) to sulfate with the addition of at least one selected from a list consisting of: air, oxygen, magnesium oxide, magnesium hydroxide and any combination thereof.

It is preferred to digest aqueous solids defining a process flow path in which said aqueous solids travel through a number of units including at least one thermophilic digestion unit prior to at least one mesophilic aerobic digestion unit, wherein said process renders said aqueous solids Class A per the US EPA' 40 CFR 503 regulation.

It is preferred to digest aqueous solids defining a process flow path in which said aqueous solids travel through a number of units including at least one thermophilic digestion unit prior to at least one mesophilic aerobic digestion unit, further comprising at least one unit adding to said aqueous solids at least one selected from a list consisting of: thiobacillus, thiobacillus denitrificans, magnesium oxide, magnesium hydroxide, nitrifiers, carbonate, bicarbonate and any combination thereof.

It is preferred to digest aqueous solids defining a process flow path in which said aqueous solids travel through a number of units including at least one thermophilic digestion unit prior to at least one mesophilic aerobic digestion unit, wherein the concentration of ammonia or sulfide(s) is reduced in the vapors from said mesophilic aerobic digestion unit(s) or said thermophilic digestion unit(s) by at least one of said mesophilic aerobic digestion unit(s).

It is preferred to digest aqueous solids defining a process flow path in which said aqueous solids travel through a number of units including at least one thermophilic digestion unit prior to at least one mesophilic aerobic digestion unit, further comprising at least one gas scrubbing unit or at least one mesophilic treatment unit, wherein the vapors from said mesophilic aerobic digestion unit(s) or from said thermophilic digestion unit(s) are sent to said gas scrubbing unit(s) or said mesophilic treatment unit(s), and wherein said gas scrubbing unit(s) or said mesophilic treatment unit(s) comprise at least one selected from a list consisting of: thiobacillus, thiobacillus denitrificans, magnesium oxide, magnesium hydroxide, nitrifiers, carbonate, bicarbonate and any combination thereof, such that the concentration of sulfide(s) or of ammonia is reduced in said vapors.

It is preferred to digest aqueous solids defining a process flow path in which said aqueous solids travel through a number of units including at least one thermophilic digestion unit prior to at least one mesophilic aerobic digestion unit, further comprising at least one gas scrubbing unit or at least one mesophilic treatment unit, wherein the vapors from said mesophilic aerobic digestion unit(s) or from said thermophilic digestion unit(s) are sent to said gas scrubbing unit or said mesophilic treatment unit, wherein at least one unit adds to said gas scrubbing unit(s) or said mesophilic treatment unit(s) at least one selected from a list consisting of: magnesium oxide, magnesium hydroxide, thiobacillus, thiobacillus denitrificans, nitrifiers, carbonate, bicarbonate and any combination thereof.

It is preferred to digest aqueous solids defining a process flow path in which said aqueous solids travel through a number of units including at least one thermophilic digestion unit prior to at least one mesophilic aerobic digestion unit, further comprising at least one heat exchanger in the piping between at least one of: said thermophilic digestion unit(s), said mesophilic aerobic digestion unit(s) and the aqueous solids stream to said thermophillic digestion unit(s) and any combination thereof.

It is preferred to digest aqueous solids defining a process flow path in which said aqueous solids travel through a number of units including at least one thermophilic digestion unit prior to at least one mesophilic aerobic digestion unit, wherein said process further comprises at least one dewatering unit, and wherein:
  (1) the percent solids in said aqueous solids are increased by the addition of at least one selected from of a list consisting of: an amine comprising a quaternized nitrogen moiety, an iron salt, an aluminum salt and any combination thereof prior to or in combination with the addition of a cationic polyacrylamide, or
  (2) the percent solids in said aqueous solids are increased by the addition of at least one selected from of a list consisting of: an amine comprising a quaternized nitrogen moiety, an iron salt, an aluminum salt and any combination thereof prior to the addition of an anionic polyacrylamide, or
  (3) the percent solids in said aqueous solids are increased by the addition of a cationic polyacrylamide comprising a quaternized nitrogen moiety, or
  (4) the percent solids in said aqueous solids are increased by the addition of a polyacrylamide comprising a quaternized nitrogen moiety prior to the addition of a cationic or an anionic polyacrylamide, or
  (5) the percent solids in said aqueous solids are increased by the addition of at least one selected from of a list consisting of: a polyquaternary amine, an iron salt, an aluminum salt and any combination thereof prior to or in combination with a polyacrylamide comprising a quaternized nitrogen moiety.

It is preferred to digest aqueous solids defining a process flow path in which said aqueous solids travel through a number of units including at least one thermophilic digestion unit prior to at least one mesophilic aerobic digestion unit, wherein said process further comprises at least one dewatering unit, and wherein said process further comprises at least one hot air and/or hot air/evaporative drying unit.

It is preferred to digest aqueous solids defining a process flow path in which said aqueous solids travel through a number of units including at least one thermophilic digestion unit prior to at least one mesophilic aerobic digestion unit, wherein said process further comprises at least one dewatering unit, and wherein the water from said dewatering unit(s) is sent to at least one mesophilic treatment unit, wherein ammonia or sulfide(s) is reduced in said aqueous solids.

It is preferred to digest aqueous solids defining a process flow path in which said aqueous solids travel through a number of units including at least one thermophilic digestion unit prior to at least one mesophilic aerobic digestion unit, wherein said process further comprises at least one dewatering unit, and wherein the water from said dewatering unit(s) is sent to at least one mesophilic treatment unit, wherein ammonia or sulfide(s) is reduced in said aqueous solids, further comprising at least one unit adding to said mesophilic unit(s) or to said water prior to said mesophilic unit(s) at least one selected from a list consisting of thiobacillus, thiobacillus denitrificans, nitrifiers, magnesium oxide, magnesium hydroxide, carbonate, bicarbonate and any combination thereof.

It is preferred to digest aqueous solids defining a process flow path in which said aqueous solids travel through a number of units including at least one thermophilic digestion unit prior to at least one mesophilic aerobic digestion unit, further comprising at least one anaerobic digestion unit operating downstream of said messophilic digestion unit(s), wherein said anaerobic digestion unit(s) is thermophilic and/or mesophilic, and wherein facultative biological cultures therein transform nitrates or nitrites into nitrogen gas.

It is preferred to digest aqueous solids defining a process flow path in which said aqueous solids travel through a number of units including at least one thermophilic digestion unit prior to at least one mesophilic aerobic digestion unit, further comprising at least one unit mixing said aqueous solids with at least one selected from a list consisting of: a nitrogen salt, urea, an organic-nitrogen compound, a phosphate salt, an organic-phosphorous compound, a potassium salt, an ammonia/phosphate compound and any combination thereof.

It is preferred to digest aqueous solids defining a process flow path in which said aqueous solids travel through a number of units including at least one thermophilic digestion unit prior to at least one mesophilic aerobic digestion unit, further comprising at least one unit mixing said aqueous solids with at least one of or a salt made from a list consisting of: iron, calcium, magnesium, copper, manganese, zinc, sulfur, selenium, chromium, molybdenum, iodine and any combination thereof.

Apparatus

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), wherein ammonia and/or sulfide(s) is removed in said mesophilic aerobic digestion unit(s).

It is preferred to build and/or operate an apparatus for aqueous solids treatment comprising one or more treatment units defining a process flow path in which aqueous solids travel including at least one thermophilic digestion unit, and at least one messophilic aerobic digestion unit downstream of said thermophilic digestion unit(s), wherein ammonia and/or sulfide(s) is removed in said mesophilic aerobic digestion unit(s), wherein said apparatus renders said aqueous solids Class A per the US EPA's 40 CFR regulations.

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), wherein ammonia and/or sulfide(s) is removed in said mesophilic aerobic digestion unit(s), wherein said aqueous solids from said apparatus contain an ammonia concentration of less than approximately 350 mg/L or a sulfide concentration of less than approximately 5 mg/L.

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), wherein ammonia and/or sulfide(s) is removed in said mesophilic aerobic digestion unit(s), wherein said aqueous solids within said mesophilic aerobic digestion unit(s) comprise at least one selected from a list consisting of: thiobacillus, thiobacillus denitrificans, magnesium oxide, magnesium hydroxide, nitrifiers, carbonate, bicarbonate and any combination thereof.

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), wherein ammonia and/or sulfide(s) is removed in said mesophilic aerobic digestion unit(s), further comprising at least one unit adding to said aqueous solids at least one selected from a list consisting of: thiobacillus, thiobacillus denitrificans, magnesium oxide, magnesium hydroxide, nitrifiers, carbonate, bicarbonate and any combination thereof.

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), wherein ammonia and/or sulfide(s) is removed in said mesophilic aerobic digestion unit(s), wherein the concentration of ammonia and/or sulfide (s) is reduced in the vapors from said mesophilic aerobic digestion unit(s) or said thermophilic digestion unit(s) by said messophilic aerobic digestion unit(s).

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), wherein ammonia and/or sulfide(s) is removed in said mesophilic aerobic digestion unit(s), further comprising at least one gas scrubbing unit or at least one mesophilic treatment unit, wherein the vapors from said mesophilic aerobic digestion unit(s) or from said thermophilic digestion unit(s) are sent to said gas scrubbing unit (s) or to said mesophilic treatment unit(s), and wherein said gas scrubbing unit(s) or said mesophilic treatment unit(s) comprise at least one selected from a list consisting of: thiobacillus, thiobacillus denitrificans, nitrifiers, and any combination thereof, such that the concentration of sulfide(s) and/or ammonia is reduced in said vapors.

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), wherein ammonia and/or sulfide(s) is removed in said mesophilic aerobic digestion unit(s), further comprising at least one gas scrubbing unit or at least one mesophilic treatment unit, wherein the vapors from said mesophilic aerobic digestion unit(s) or from said thermophilic digestion unit(s) are sent to said gas scrubbing unit (s), and wherein said gas scrubbing unit(s) comprise at least one selected from a list consisting of: thiobacillus, thiobacillus denitrificans, nitrifiers, and any combination thereof, such that the concentration of sulfide(s) and/or ammonia is reduced in said vapors, including at least one unit to add to said gas scrubbing unit(s) or said mesophilic treatment unit(s) at least one selected from a list consisting of: magnesium oxide, magnesium hydroxide, thiobacillus, thiobacillus denitrificans, nitrifiers, carbonate, bicarbonate and any combination thereof.

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), wherein at least one heat exchanger exists in the piping between at least one of: said thermophilic digestion unit(s), said mesophilic digestion unit (s), the aqueous solids stream to said thermophilic digestion unit(s) and any combination thereof.

It is preferred to build and/or operate an apparatus for aqueous solids treatment comprising one or more treatment units defining a process flow path in which aqueous solids travel including at least one thermophilic digestion unit, and at least one messophilic aerobic digestion unit downstream of said thermophilic digestion unit(s), further comprising at least one unit dewatering said aqueous solids, wherein:

(1) the percent solids in said aqueous solids are increased by the addition of a at least one selected from of a list consisting of: an amine comprising a quaternized nitrogen moiety, an iron salt, an aluminum salt and any combination thereof prior to or in combination with a cationic polyacrylamide, or (2) the percent solids in said aqueous solids are increased by the addition of at least one selected from of a list consisting of an amine comprising a quaternized nitrogen moiety, an iron salt, an aluminum salt and any combination thereof prior to the addition of an anionic polyacrylamide, or (3) the percent solids in said aqueous solids are increased by the addition of a cationic polyacrylamide comprising a quaternized nitrogen moiety, or (4) the percent solids in said aqueous solids are increased by the addition of a polyacrylamide comprising a quaternized nitrogen moiety prior to the addition of a cationic or an anionic polyacrylamide, or (5) the percent solids in said aqueous solids are increased by the addition of at least one selected from of a list consisting of: a polyquaternary amine, an iron salt, an aluminum salt and any combination thereof prior to or in combination with a polyacrylamide comprising a quaternized nitrogen moiety.

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), further comprising at least one unit dewatering said aqueous solids, further comprising a hot air and/or hot air/evaporative drying unit.

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), further comprising at least one unit dewatering said aqueous solids, wherein the water from said dewatering unit(s) is sent to a mesophilic treatment unit, wherein ammonia or sulfide(s) is reduced.

It is preferred to build and/or operate an apparatus for aqueous solids treatment comprising one or more treatment units defining a process flow path in which aqueous solids travel including at least one thermophilic digestion unit, and at least one mesophilic aerobic digestion unit downstream of said thermophilic digestion unit(s), further comprising at least one unit dewatering said aqueous solids, wherein the water from said dewatering unit(s) is sent to a mesophilic treatment unit, wherein ammonia or sulfide(s) is reduced, wherein said mesophilic treatment unit(s) comprises at least one selected from a list consisting of: magnesium oxide, magnesium hydroxide, thiobacillus, thiobacillus denitrificans, nitrifiers, carbonate, bicarbonate and any combination thereof.

It is preferred to build and/or operate an apparatus for aqueous solids treatment comprising one or more treatment units defining a process flow path in which aqueous solids travel including at least one thermophilic digestion unit, and at least one messophilic aerobic digestion unit downstream of said thermophilic digestion unit(s), further comprising at least one unit dewatering said aqueous solids, wherein the water from said dewatering unit(s) is sent to a mesophilic treatment unit, wherein ammonia or sulfide(s) is reduced further comprising at least one unit adding to said mesophilic treatment unit(s) or to said water prior to said mesophilic treatment unit(s) at least one selected from a list consisting of: thiobacillus, thiobacillus denitrificans, nitrifiers, magnesium oxide, magnesium hydroxide, carbonate, bicarbonate and any combination thereof.

It is preferred to build and/or operate an apparatus for aqueous solids treatment comprising one or more treatment units defining a process flow path in which aqueous solids travel including at least one thermophilic digestion unit, further comprising at least one anaerobic unit, wherein said anaerobic unit(s) is thermophilic or mesophilic, and wherein facultative biological cultures therein transform nitrates and/or nitrites into nitrogen gas.

It is preferred to build and/or operate an apparatus for aqueous solids treatment comprising one or more treatment units defining a process flow path in which aqueous solids travel including at least one thermophilic digestion unit, further comprising a unit mixing said aqueous solids from said apparatus with at least one selected from a list consisting of: a nitrogen salt, urea, an organic-nitrogen compound, a phosphate salt, an organic-phosphorous compound, a potassium salt, an ammonia/phosphate compound and any combination thereof.

It is preferred to build and/or operate an apparatus for aqueous solids treatment comprising one or more treatment units defining a process flow path in which aqueous solids travel including at least one thermophilic digestion unit, further comprising a unit mixing said aqueous solids from said apparatus with at least one of or a salt made from a list consisting of: iron, calcium, magnesium, copper, manganese, zinc, sulfur, selenium, chromium, molybdenum, iodine and any combination thereof.

EXAMPLE 1

On Aug. 02, 2001, a sample was obtained from final aqueous solids cake product of the belt dewatering press in Beaumont, Tex. Cake solid from the belt press dewatering operation are normally near 30 percent. Beaumont operates a mesophilic anaerobic digester. The cake solids were utilized in bench scale testing to ascertain whether thiobacillus or magnesium oxide were viable additives to control sulfide odors from the aqueous solids.

Each sample was prepared, mixed and allowed to sit for 24 hours. After 24 hours, observations were made on the sulfide content of the sludge. Since sulfide(s) have an odor threshold of 2 ppb, an individual smell or olfactory test is deemed to be sufficient. Results of this test are tabulated below.

| Odor Control Testing of DS | | |
|---|---|---|
| NO. | SAMPLE | ODOR/RESULT |
| 1 | Control | Heavy sulfide odor/no result |
| 2 | 1% MgO | Slight sulfide and bran/fair |
| 3 | 5% MgO | Bran/very good |
| 4 | 0.5% Bio "S-L" | Sour/marginal |
| 5 | 1% MgO + 0.25% Bio "S-L" | Musty/fair |

EXAMPLE 2

Based upon completion and revision of several tests, it is determined that blends of S Cultures with nitrifiers are capable of allowing nitrification to occur. During the tests, the goal of the treatment of the wastewater was the achievement of nitrification, by applying co-cultures of the thiobacillus bacteria with various heterotrophs.

S Cultures blended in concentrations of 25% or more with various heterotrophs form co-cultures which are capable of minimizing sulfide content and to allow nitrification to occur, without application of any nitrifiers.

BOD removal and nitrification is the operating challenge of a 45-acre pond having 3 MGD of wastewater flow per day in Equine, Ariz. At the onset, the level of sulfide(s) in the wastewater was high enough that nitrification halted. The level of sulfates in the sludge of the bottom of the pond was over 10,000 ppm. Dissolved oxygen had reduced to non-detectable levels in various parts of the pond. Five tons of sodium nitrate and one hundred pounds (100 pounds) of co-cultures of thiobacillus with various heterotrophs were added to the wastewater. The sodium nitrate was added to initiate anoxic conditions for the thiobacillus. The co-cultures comprised a 20 percent concentration of thiobacillus. Within five days, the ammonia level dropped from 30 ppm to 4 ppm. No nitrifiers were used or required in the process. Nitrification was performed by nitrifiers that were originally present in the pond.

EXAMPLE 3

A bench test was performed utilizing an electric variable speed beaker stir system, commonly referred to as ajar test. 2000 ppm of CV 3750 (20% active) was added to 500 ml of sludge from a thermophilic digestion. The percentage of solids in the sludge was about 4.4 percent. The beaker was allowed to stir at 120 rpm for 30 seconds. At 30 seconds, the rpm was reduced to 90 and 1500 ppm of CV 5120 in a 0.25 percent solution was added to the beaker. After 15 seconds, the stir speed was slowed to 30 rpm and mixed for another 30 seconds. Large, heavy floc (e.g. with a diameter of at least 4 mm) was formed with a somewhat cloudy supernatant.

EXAMPLE 4

A jar test was performed utilizing an electric variable speed beaker stir system. 3000 ppm of CV 3650 (20% active) was added to 500 ml of sludge from a thermophilic digestion. The percentage of solids in the sludge was about 4.4 percent. The beaker was allowed to stir at 120 rpm for 30 seconds. At 30 seconds, the rpm was reduced to 90 and 250 ppm of CV 6140 in a 0.25 percent solution was added to the beaker. After 15 seconds, the stir speed was slowed to 30 rpm and mixed for another 30 seconds. Large heavy floc (e.g. with a diameter of at least about 4 mm) was formed with a very clear supernatant.

EXAMPLE 5

A jar test was performed utilizing an electric variable speed beaker stir system. 1400 ppm of CV 3230 (Epi-DMA with a high molecular weight e.g. over 300,000 and 50% active) was added to 500 ml of sludge from a thermophilic digestion. The percentage of solids in the sludge was about 4.4 percent. The beaker was allowed to stir at 120 rpm for 30 seconds. At 30 seconds, the rpm was reduced to 90 and 260 ppm of CV 6140 in a 0.25 percent solution was added to the beaker. After 15 seconds, the stir speed was slows to 30 rpm and mixed for another 30 seconds. Large, heavy floc (e.g. with a diameter of at least about 4 mm) was formed with a very clear supernatant.

EXAMPLE 6

A jar test was performed utilizing an electric variable speed beaker stir system. 850 ppm of CV 5380 (polyacrylamide with a DADMAC cationic co-monomer) were added to about 500 ml of sludge from a thermophilic digestion. The percentage of solids in the sludge was about 4.4 percent. The beaker was allowed to stir at 90 rpm for 15 seconds. At 15 seconds, the rpm was reduced to 30 and mixed for another 30 seconds. Small floc (e.g. with a diameter under about 3 mm) was formed with a very clear supernatant.

EXAMPLE 7

A jar test was performed utilizing a glass jar to mix polymer with the sludge. 350 ppm of CV 5380 (polyacrylamide with a DADMAC cationic co-monomer) along with 450 ppm of Clear Value CV 5120 (traditional polyacrylamide with a medium charge density) were added to about 100 ml of sludge from a thermophilic digestion. The percentage of solids in the sludge was about 4.7 percent. The jar was gently shaken for approximately 30 seconds. At 30 seconds, the results were observed. Large, strong floc (e.g. with a diameter of at least about 4 mm) was formed with a very clear supernatant.

Example 7 was repeated with a varying cationic charge densities for the traditional polyacrylamide polymers. The best results were obtained with CV 5120.

EXAMPLE 8

A plant test was performed on Sep. 10, 1996 at the municipal wastewater treatment facility for the City of College Station, Tex. This facility has a thermophilic digestion as designed by Kruger, Inc. The average temperature of the digester is usually near 149° F. (65° C.). Dewatering is accomplished on a Sharpels Polymixer 75000 centrifuge. Polymer inversion is accomplished on a Polymixer 500, which is designed for dry polymer. Normal plant operation requires 1500 to 2000 ppm of Nalco 9909 obtaining variable sludge cake dryness, a final centrate that is usually much over 200 ppm of total suspended solids (TSS) and a plant throughput of 10 to 15 gpm of sludge, The centrifuge was started up on CV 5380 having a polymer concentration of 800 ppm and a plant throughput of 30 gpm. The sludge produced was low on cake solids obtaining an average near 12 percent. The centrate was 100 to 200 TSS with nearly all of the total suspended solid from small floc (e.g. of a diameter of less than 1 mm) that survived the centrifuge. Even though this was an operational improvement, the floc produced was weak for the type of treatment incurred within the centrifuge.

EXAMPLE 9

A plant test was performed on Sep. 10, 1996 at the municipal wastewater treatment facility for the City of College Station, Tex. This facility has a thermophilic digestion as designed by Kruger, Inc. The average temperature of the digester is usually near 149° F. (65° C.). Dewatering is accomplished on a Sharpels Polymixer 75000 centrifuge. Polymer inversion is accomplished on a Polymixer 500, which is designed for a dry polymer. Normal plant operation requires 1500 to 2000 ppm of Nalco 9909 obtaining variable sludge cake dryness, a final centrate that is usually much over 200 ppm of total suspended solids (TSS) and a plant throughput of 10 to 15 gpm of sludge, The centrifuge was started up on CV 5380 and Nalco 9909 with the CV 5380 having a polymer concentration of 400 ppm and the Nalco 9909 having a concentration of 450 ppm. The centrifuge was run between 45 and 55 gpm of sludge throughput. The produced sludge was over 18 percent cake solids. The centrate was less than 50 TSS.

EXAMPLE 10

A plant test was performed on Feb. 18, 1998 at the municipal wastewater treatment facility for the City of Texarkana, Tex. This facility operates a traditional anaerobic digestion process. However, during the last six months of 1997, the digestion temperature was slowly increased until 120° F. was obtained; the fecal count dropped to zero on the digested sludge.

Dewatering is accomplished on a two-meter Ashbrook belt filter process. The belt presses were started up on CV5240H and CV3650 at varying concentrations. The most economical dewatered sludge was made with a 60:40 blend of CV 5140H with CV 3650, respectively. This operation reduced plant operating cost by approximately 20%, obtaining in excess 24% sludge cake solids. Other polyacrylamides are unable to even obtain 18 % cake solids at any dosage.

EXAMPLE 11

A jar test was performed utilizing a 1-gallon plastic container. Sludge was obtained front he thermophilic process at College Station, Tex. In this test, aluminum sulfate, ferric chloride, and blends of aluminum sulfate and ferric chloride were evaluated with CV 3650 in combination with CV 5135D. Results of this test are tabulated below.

TDS Dewatering Test with Iron/Aluminum and Cationic Polyacrylamides

| CV 3650 | 48% Aluminum Sulfate | 40% FeCl | CV 5135D | Supernatant Performance | Floc Performance |
|---|---|---|---|---|---|
| — | 10,000 | — | 150 | Clear | Strong/tight |
| — | 7,500 | — | 350 | Cloudy | Loose |
| — | 8,500 | — | 250 | Clear | Loose |
| — | 12,500 | — | 150 | Clear | Loose |
| 500 | 3,000 | — | 200 | Clear-yellow | Strong/tight |
| 250 | 4,000 | — | 225 | Clear-yellow | Strong/tight |
| 600 | 1,500 | — | 175 | Clear-yellow | Strong/tight |
| — | — | 10,000 | 150 | Clear | Poor-water |
| — | — | 7,500 | 350 | Clear | Loose |
| 500 | — | 4,000 | 400 | Clear | Loose |
| 400 | — | 4,000 | 600 | Clear | Loose |

EXAMPLE 12

A jar test was performed with sludge from the thermophilic digestion process at Gulf Coast Waste Disposal Authority in Baytown, Tex. In this test, 30 ppm to 50 ppm of CV 3650 in combination with either CV 5110, CV 5120, CV 5140, CV 5160, or CB5180 at a concentration of 55 ppm to 100 ppm formed a good strong floc with a clear supernatant. Any and all polyacrylamides tried alone required in excess of 350 ppm to dewater.

EXAMPLE 13

Four five-gallon buckets were filled with float from an air flotation recovery unit at a chicken part production facility. Each bucket contained 30 lbs. of chicken and chicken parts containing fats and proteins.

Temperature of operation was approximately 90° F. Measurements are started upon addition of magnesium oxide. The first set of measurements, which are listed as "CONTROL" data, is made without use of magnesium oxide. The pH values of this protein test are on the next page.

As can be seen, when the MgO preservative is used with animal and animal part containing fats and proteins, a relatively longer term of stability in pH conditions of animal and animal part exists. Without the use of preservative, acidic conditions immediately started. When the MgO preservative is used, acidic conditions of animal and animal part deterioration can be delayed for several hours, even for a day. (Please refer to data from use of 2000 ppm of preservative.)

Protein Stability Testing with Magnesium Oxide

| | | Amount of Magnesium Oxide (MgO) | | |
|---|---|---|---|---|
| TIME | CONTROL (pH) | 1500 ppm (pH) | 2000 ppm (pH0) | 2500 ppm (pH) |
| 9:30 a.m. | 7.4 | 9.3 | 9.3 | 9.3 |
| 12:30 p.m. | 6.7 | 9.4 | 9.3 | 8.0 |
| 3:30 p.m. | 5.9 | 7.8 | 7.6 | 7.1 |
| 6:30 p.m. | 5.6 | 6.5 | 7.4 | 7.0 |
| 9:30 p.m. | 5.5 | 6.7 | 7.2 | 6.6 |
| 12:30 a.m. | 5.5 | 6.5 | 6.6 | 5.6 |
| 3:30 a.m. | 5.4 | 6.4 | 6.6 | 6.4 |
| 6:30 a.m. | 5.3 | 6.7 | 6.7 | 6.6 |
| 9:30 a.m. | 5.3 | 6.4 | 6.7 | 6.6 |

Certain objects are set forth above and made apparent from the foregoing description. However, since certain changes may be made in the above description without departing from the scope of the invention, it is intended that all matters contained in the foregoing description shall be interpreted as illustrative only of the principles of the invention and not in a limiting sense. With respect to the above description, it is to be realized that any descriptions, drawings and examples deemed readily apparent and obvious to one skilled in the art and all equivalent relationships to those described in the specification are intended to be encompassed by the instant invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention, which, as a matter of language, might be said to fall in between.

What is claimed:

1. A method of aqueous solids treatment comprising:
   digesting the aqueous solids in a thermophilic digestion vessel under thermophilic conditions to produce thermophilic digested solids, wherein
   the thermophilic digestion vessel is aerobic or anaerobic; then
   transferring the thermophilic digested solids to a mesophilic aerobic digestion vessel; and then
   digesting the transferred thermophilic digested solids in the mesophilic aerobic digestion vessel under mesophilic conditions; wherein
   the mesophilic aerobic digestion vessel comprises bacteria capable of oxidizing hydrogen sulfide to sulfur or reducing sulfur dioxide to sulfur, and wherein
   the bacteria metabolize the sulfur, such that
   the concentration of hydrogen sulfide or of sulfur dioxide within the thermophilic digested solids is reduced during said mesophilic aerobic digestion.

2. The method of claim 1, wherein said method renders said thermophilic digested solids Class A per the US EPA's 40 CFR 503 regulation.

3. The method of claim 1, wherein said method renders said thermophilic digested solids to comprise:
   an ammonium hydroxide concentration of less than 350 mg/L, or a concentration of said hydrogen sulfide and said sulfur dioxide of less than 5 mg/L.

4. The method of claim 1, wherein said mesophilic aerobic digestion vessel comprises at least one selected from the group consisting of: *Thiobacillus, Thiobacillus denitrificans*, magnesium oxide, magnesium hydroxide, nitrifiers, carbonate, bicarbonate and any combination thereof.

5. The method of claim 1, wherein at least one selected from the group consisting of: air, *Thiobacillus, Thiobacillus denitrificans*, magnesium oxide, magnesium hydroxide, nitrifiers, carbonate, bicarbonate and any combination thereof is added to said aqueous solids in said mesophilic aerobic digestion vessel or to said aqueous solids upstream of said mesophilic aerobic digestion vessel.

6. The method of claim 1, wherein the concentration of ammonia or of hydrogen sulfide or of sulfur dioxide is reduced in the vapors from said mesophilic aerobic digestion vessel or in the vapors from said thermophilic digestion vessel by at least one gas scrubbing mesophilic treatment unit; wherein
the at least one gas scrubbing mesophilic treatment unit(s) comprise at least one selected from the group consisting of: magnesium oxide, magnesium hydroxide, *Thiobacillus, Thiobacillus denitrificans*, nitrifiers and any combination thereof.

7. The method of claim 6, further comprising the step of adding to said at least one gas scrubbing mesophilic treatment unit(s) at least one selected from the group consisting of: magnesium oxide, magnesium hydroxide, *Thiobacillus, Thiobacillus denitrificans*, nitrifiers, carbonate, bicarbonate and any combination thereof.

8. The method of claim 1, further comprising the cooling of said thermophilic digested solids from said thermophilic digestion vessel to said mesophilic aerobic digestion vessel, along with the heating of said aqueous solids to said thermophilic digestion vessel.

9. The method of claim 1, 2, 4 or 5, wherein said method further comprises the dewatering of said thermophilic digested solids, and wherein
the percent solids in said thermophilic digested solids is increased.

10. The method of claim 9, further comprising the addition to said thermophilic digested solids of at least one selected from the group consisting of: an amine comprising a quaternized nitrogen moiety, an iron salt, an aluminum salt and any combination thereof along with or prior to the addition of a cationic polyacrylamide.

11. The method of claim 9, further comprising the addition to said thermophilic digested solids of a cationic polyacrylamide comprising a quaternized nitrogen moiety.

12. The method of claim 9, further comprising the addition to said thermophilic digested solids of a polyacrylamide comprising a quaternized nitrogen moiety in concert with or prior to the addition of a cationic polyacrylamide or prior to the addition of an anionic polyacrylamide.

13. The method of claim 9, further comprising the addition to said thermophilic digested solids of a polyacrylamide comprising a quaternized nitrogen moiety in concert with or after the addition of at least one selected from the group consisting of:
a polyquaternary amine, an iron salt, an aluminum salt and any combination thereof.

14. The method of claim 9, wherein said method further comprises hot air or evaporative air drying.

15. The method of claim 9, wherein the water from said dewatering is sent to said mesophilic digestion vessel or a to a mesophilic treatment unit, wherein the concentration of ammonium hydroxide or of hydrogen sulfide or of sulfur dioxide is reduced in the water.

16. The method of claim 15, wherein said mesophilic treatment unit comprises at least one selected from the group consisting of: magnesium oxide, magnesium hydroxide, *Thiobacillus, Thiobacillus denitrificans*, nitrifiers, carbonate, bicarbonate and any combination thereof.

17. The method of claim 16, further comprising the addition of at least one selected from the group consisting of: air, magnesium oxide, magnesium hydroxide, *Thiobacillus, Thiobacillus denitrificans*, nitrifiers, carbonate, bicarbonate and any combination thereof to said mesophilic treatment unit or to said water prior to said mesophilic treatment unit.

18. The method of claim 1, further comprising a step of thermophilic anaerobic digestion or facultative mesophilic digestion, wherein
facultative biological cultures therein transform nitrates or nitrites into nitrogen gas, wherein
the thermophilic anaerobic digestion can comprise said thermophilic digestion vessel or another vessel comprising thermophilic anaerobic digestion, and wherein
the facultative mesophilic digestion can comprise said mesophilic aerobic digestion vessel or another vessel comprising facultative mesophilic digestion.

19. The method of claim 1, further comprising the recycle of at least a portion of said thermophilic digested solids from said mesophilic aerobic digestion vessel to said thermophilic digestion vessel.

20. A method of reducing the concentration of hydrogen sulfide or of sulfur dioxide within aqueous solids, the method comprising
adding to the aqueous solids *Thiobacillus* or *Thiobacillus denitrificans*, wherein
at least a portion of the hydrogen sulfide or of the sulfur dioxide is converted to elemental sulfur being metabolized by the *Thiobacillus* or *Thiobacillus denitrificans*.

21. The method of claim 20, wherein after said addition said concentration of said hydrogen sulfide and of said sulfur dioxide is less than 5 mg/L.

22. The method of claim 20, further comprising the addition of nitrifiers to said aqueous solids.

23. The method of claim 20, wherein the ammonium hydroxide concentration within said aqueous solids after said addition is less than 350 mg/L.

24. A method of aqueous solids treatment, comprising
a step of mesophilic aerobic digestion, wherein
the mesophilic aerobic digestion comprises *Thiobacillus* or *Thiobacillus Denitrificans*, and wherein
at least a portion of hydrogen sulfide or of sulfur dioxide is converted to elemental sulfur being metabolized by the *Thiobacillus* or *Thiobacillus denitrificans*.

25. The method of claim 24, wherein nitrification is performed.

26. The method of claim 25, further comprising nitrifiers in said mesophilic aerobic digestion.

27. The method of claim 26, wherein said nitrifiers comprise nitrosomonas or nitrosomonas and nitrobactor.

28. The method of claim 25, wherein carbonate or bicarbonate is added.

29. The method of claim 1, wherein said thermophilic digested solids are used as a fertilizer.

30. The method of claim 1, wherein said thermophilic digested solids are blended with at least one selected from the group consisting of: a nitrogen salt, urea, an organic-nitrogen compound, a phosphate salt, an organic-phosphorous compound, a potassium salt, an ammonia/phosphate compound and any combination thereof.

31. The method of claim 1, wherein said solids are blended with a salt comprising at least one selected from the group consisting of: iron, calcium, magnesium, copper, manganese, zinc, sulfur, selenium, chromium, molybdenum, iodine and any combination thereof.

32. A process for digesting aqueous solids defining a process flow path in which the aqueous solids travel through a number of units including at least one thermophilic digestion unit prior to at least one mesophilic aerobic digestion unit, wherein
the thermophilic digestion unit is aerobic or anaerobic;
the aqueous solids in said at least one mesophilic aerobic digestion unit(s) comprise *Thiobacillus* or *Thiobacillus denitrificans*, wherein
the concentration of hydrogen sulfide or of sulfur dioxide is reduced in the aqueous solids, and wherein
at least a portion of the hydrogen sulfide or of the sulfur dioxide is converted to elemental sulfur being metabolized by the *Thiobacillus* or *Thiobacillus denitrificans*.

33. The process of claim 32, wherein said aqueous solids from said at least one mesophilic aerobic digestion unit(s) comprise a concentration of said hydrogen sulfide and said sulfur dioxide of less than 5 mg/L.

34. The process of claim 32, wherein said aqueous solids from said at least one mesophilic aerobic digestion unit(s) comprise a concentration of ammonium hydroxide of less than 350 mg/L.

35. The process of claim 32, wherein said process renders said aqueous solids Class A per the US EPA's 40 CFR 503 regulation.

36. The process of claim 32, further comprising at least one unit adding to said aqueous solids prior to or in said at least one mesophilic treatment unit(s) at least one selected from the group consisting of: *Thiobacillus, Thiobacillus denitrificans*, magnesium oxide, magnesium hydroxide, nitrifiers, carbonate, bicarbonate and any combination thereof.

37. The process of claim 32, further comprising at least one gas scrubbing mesophilic treatment unit, wherein
the vapors from said mesophilic aerobic digestion unit(s) or from said thermophilic digestion unit(s) are sent to the at least one gas scrubbing mesophilic treatment unit(s), wherein
the at least one gas scrubbing mesophilic treatment unit(s) comprise at least one selected from the group consisting of: *Thiobacillus, Thiobacillus denitrificans*, magnesium oxide, magnesium hydroxide, nitrifiers, carbonate, bicarbonate and any combination thereof, such that the concentration of hydrogen sulfide or of sulfur dioxide is reduced in said vapors, and wherein
at least a portion of the hydrogen sulfide or of the sulfur dioxide is converted to elemental sulfur.

38. The process of claim 37, further comprising at least one unit adding to said at least one gas scrubbing mesophilic treatment unit(s) at least one selected from the group consisting of: magnesium oxide, magnesium hydroxide, *Thiobacillus, Thiobacillus denitrificans*, nitrifiers, carbonate, bicarbonate and any combination thereof.

39. The process of claim 32, further comprising at least one heat exchanger in aqueous solids piping prior to said at least one thermophilic digestion unit(s) or in aqueous solids piping between said at least one thermophilic digestion unit(s) and said at least one mesophilic aerobic digestion unit(s).

40. The process of claim 32, 36 or 37, wherein said process further comprises a step of dewatering in said process at a point after said at least one mesophilic aerobic digestion unit, and wherein
the step of dewatering increases the percent solids in said aqueous solids.

41. The process of claim 40, further comprising the addition to said aqueous solids of at least one selected from of the group consisting of: an amine comprising a quaternized nitrogen moiety, an iron salt, an aluminum salt and any combination thereof along with or prior to the addition of a cationic polyacrylamide.

42. The process of claim 40, further comprising the addition to said aqueous solids of a cationic polyacrylamide comprising a quaternized nitrogen moiety.

43. The process of claim 40, further comprising the addition to said aqueous solids of a polyacrylamide comprising a quaternized nitrogen moiety along with or prior to the addition of a cationic polyacrylamide or prior to the addition of an anionic polyacrylamide.

44. The process of claim 40, further comprising the addition to said aqueous solids a cationic polyacrylamide comprising a quaternized nitrogen moiety in concert with or after the addition of at least one selected from the group consisting of: a polyquaternary amine, an iron salt, an aluminum salt and any combination thereof.

45. The process of claim 40, wherein said process further comprises at least one hot air or evaporative air drying unit in said process at a point in said process downstream of said dewatering unit, and wherein
the percent solids in said aqueous is increased.

46. The process of claim 40, wherein the water from said dewatering unit(s) is sent to said at least one mesophilic aerobic digestion unit(s) or to at least one mesophilic treatment unit, wherein
the concentration of hydrogen sulfide or of sulfur dioxide is reduced in the water, and wherein
at least a portion of the hydrogen sulfide or of the sulfur dioxide is converted to elemental sulfur.

47. The process of claim 46, wherein said at least one mesophilic treatment unit(s) comprise at least one selected from the group consisting of:
magnesium oxide, magnesium hydroxide, *Thiobacillus, Thiobacillus denitrificans*, nitrifiers, carbonate, bicarbonate and any combination thereof.

48. The process of claim 46, further comprising at least one unit adding to said at least one mesophilic treatment unit(s) or to said water prior to said at least one mesophilic treatment unit(s) at least one selected from the group consisting of: *Thiobacillus, Thiobacillus denitrificans*, nitrifiers, magnesium oxide, magnesium hydroxide, carbonate, bicarbonate and any combination thereof.

49. The process of claim 47, wherein said nitrifiers comprise nitrosomonas or nitrosomonas and nitrobactor.

50. The process of claim 32, further comprising at least one anaerobic digestion unit or at least one facultative mesophilic digestion unit operating downstream of said mesophilic digestion unit(s), wherein
facultative biological cultures therein transform nitrates or nitrites into nitrogen gas.

51. The process of claim 32, further comprising the recycle of at least a portion of said aqueous solids from said at least one mesophilic aerobic digestion unit(s) to said at least one thermophilic digestion unit(s).

52. The process of claim 32, wherein said aqueous solids from said process are used as a fertilizer.

53. The process of claim 52, further comprising at least one unit mixing said aqueous solids with at least one selected from the group consisting of: a nitrogen salt, urea, an organic-nitrogen compound, a phosphate salt, an organic-phosphorous compound, a potassium salt, an ammonia/phosphate compound and any combination thereof.

54. The process of claim 52, further comprising at least one unit mixing said aqueous solids with at least one salt of an element from the group consisting of:
iron, calcium, magnesium, copper, manganese, zinc, sulfur, selenium, chromium, molybdenum, iodine and any combination thereof.

55. The method of claim 9, further comprising the addition to said thermophilic digested solids of at least one selected from of the group consisting of: an amine comprising a quaternized nitrogen moiety, an iron salt, an aluminum salt and any combination thereof prior to the addition of an anionic polyacrylamide.

56. The process of claim 40, further comprising the addition to said aqueous solids of at least one selected from of the group consisting of: an amine comprising a quaternized nitrogen moiety, an iron salt, an aluminum salt and any combination thereof prior to the addition of an anionic polyacrylamide.

57. The method of claim 9, further comprising the addition to said thermophilic digested solids a combination, said combination comprising
a cationic polyacrylamide comprising a quatemized nitrogen moiety in concert with or after at least one selected from of the group consisting of: an amine comprising a quaternized nitrogen moiety, an iron salt, an aluminum salt and any combination thereof, wherein
said combination is added to said aqueous solids with or prior to a cationic polyacrylamide or prior to an anionic polyacrylamide.

58. The process of claim 40, further comprising the addition to said aqueous solids a combination, said combination comprising
a cationic polyacrylamide comprising a quaternized nitrogen moiety in concert with or after at least one selected from of the group consisting of: an amine comprising a quatemized nitrogen moiety, an iron salt, an aluminum salt and any combination thereof, wherein
said combination is added to said aqueous solids with or prior to a cationic polyacrylamide or prior to an anionic polyacrylamide.

59. The method of claim 20 or 24, further comprising adding magnesium oxide or magnesium hydroxide to said aqueous solids.

60. The process of claim 32, wherein said aqueous solids further comprise magnesium oxide or magnesium hydroxide.

61. The process of claim 48, wherein said nitrifiers comprise nitrosomonas or nitrosomonas and nitrobactor.

* * * * *